US008223268B2

(12) United States Patent
Fujiwara et al.

(10) Patent No.: US 8,223,268 B2
(45) Date of Patent: Jul. 17, 2012

(54) IMAGE PROCESSING APPARATUS, METHOD AND RECORDING MEDIUM

(75) Inventors: Nobuyuki Fujiwara, Kanagawa (JP); Toshiharu Yabe, Tokyo (JP); Daisuke Negi, Tokyo (JP)

(73) Assignee: Sony Corporation, Tokyo (JP)

( * ) Notice: Subject to any disclaimer, the term of this patent is extended or adjusted under 35 U.S.C. 154(b) by 662 days.

(21) Appl. No.: 12/405,283

(22) Filed: Mar. 17, 2009

(65) Prior Publication Data

US 2009/0237562 A1   Sep. 24, 2009

(30) Foreign Application Priority Data

Mar. 18, 2008 (JP) ................................ P2008-068850

(51) Int. Cl.
*H04N 5/445* (2011.01)
(52) U.S. Cl. ......... 348/564; 348/588; 348/581; 715/838
(58) Field of Classification Search .................. 348/581, 348/554–558, 588; 715/838, 800; 345/660
See application file for complete search history.

(56) References Cited

U.S. PATENT DOCUMENTS

| 6,427,048 | B2* | 7/2002 | Ito et al. ........................ 386/219 |
| 7,124,430 | B2* | 10/2006 | Aratani et al. ................. 725/142 |
| 7,164,714 | B2 | 1/2007 | Martin | |
| 2007/0252822 | A1 | 11/2007 | Kim et al. | |

FOREIGN PATENT DOCUMENTS

| EP | 1 956 838 A2 | 8/2008 |
| JP | 8-223495 | 8/1996 |
| JP | 10-174016 | 6/1998 |
| JP | 11-164215 | 6/1999 |
| JP | 11-239307 | 8/1999 |
| JP | 2003-116073 | 4/2003 |
| JP | 2007-60555 | 3/2007 |
| JP | 2007-089088 | 4/2007 |
| JP | 2007-142641 | 6/2007 |
| JP | 2007-311942 | 11/2007 |
| JP | 2007-329847 | 12/2007 |
| WO | WO 2007/097280 | 8/2007 |

OTHER PUBLICATIONS

European Search Report issued Aug. 4, 2011 in corresponding European patent application No. EP 09 25 0335.

* cited by examiner

*Primary Examiner* — Michael Lee
(74) *Attorney, Agent, or Firm* — Finnegan, Henderson, Farabow, Garrett & Dunner, L.L.P.

(57) ABSTRACT

An image processing apparatus includes: a generation unit configured to generate image signals for displaying a plurality of screens on one display surface; an operation signal acquisition unit configured to acquire an operation signal from a user; and a control unit configured to scale a focused one of the plurality of screens, when the operation signal common to the plurality of screens to scale the screen is acquired from the user.

10 Claims, 35 Drawing Sheets

IMAGE PROCESSING APPARATUS, METHOD AND RECORDING MEDIUM

CROSS REFERENCES TO RELATED APPLICATIONS

The present invention contains subject matter related to Japanese Patent Application JP 2008-068850 filed in the Japanese Patent Office on Mar. 18, 2008, the entire contents of which being incorporated herein by reference.

BACKGROUND OF THE INVENTION

1. Field of the Invention

The present invention relates to an image processing apparatus and method and a recording medium, and particularly to an image processing apparatus and method and a recording medium, in which a desired screen can be quickly scaled.

2. Description of the Related Art

In digital broadcast, images of many channels can be provided to a user. The user selects an image signal of a desired channel among the image signals of the many channels and can enjoy the image.

In general, the selection of the channel is performed by operating a remote controller to remote control an apparatus (for example, patent document 1 (JP-A-2007-89088)).

SUMMARY OF THE INVENTION

The remote controller is provided with many buttons to which specified functions are assigned. When the button and the function are brought into one-to-one correspondence with each other, a reliable operation becomes possible. For example, when a specified screen of plural displayed screens is enlarged and displayed, dedicated enlargement buttons can be provided for the respective screens.

However, when doing so, the number of buttons becomes large, and the remote controller becomes large, and further, it becomes difficult for the user to quickly enlarge a desired screen.

In view of the above circumstances, it is desirable to quickly scale a desired screen.

According to an embodiment of the present invention, there is provided an image forming apparatus including a generation unit configured to generate image signals for displaying plural screens on one display surface, an operation signal acquisition unit configured to acquire an operation signal from a user, and a control unit configured to scale a focused one of the plurality of screens, when the operation signal common to the plurality of screens to scale the screen is acquired from the user.

The common operation signal is a signal to instruct full-screen display of the screen, and the control unit can erase the not focused screen and can display the focused screen on full screen.

The plural screens include a screen of sub display areas to display thumbnail images of plural different moving images, and a screen of a main display area to display an image of the one sub display area selected from the screen of the sub display areas.

When the common operation signal is acquired in a state where the screen is displayed on full screen, the control unit releases the full-screen display and can again display the plural screens.

When the operation signal from the user to scale the image of the main display area is acquired in a state where the screen of the main display area is displayed on full screen, the control unit can scale the image of the main display area.

When the operation signal to move the image of the main display area is acquired in a state where the screen of the main display area is displayed on full screen, the control unit can move the image of the main display area.

When the operation signal to decide selection of the one sub display area is acquired in a state where the screen of the sub display areas is displayed on full screen, the control unit can scale the screen of the selected sub display area.

When the operation signal to synchronously scale the screens of the main display area and the sub display areas is acquired, the control unit can reduce one of the screens of the display areas synchronously with enlargement of the other of the screens of the display areas.

When the operation signal to switch a text information display mode is acquired, the control unit can switch between a mode in which an area for displaying the text information is displayed on both the screens of the main display area and the sub display areas, a mode in which it is displayed only on the screen of the sub display areas, and a mode in which it is displayed on neither of the screens.

When the operation signal to switch a progress bar display mode is acquired, the control unit can switch between a mode in which an area for displaying the progress bar is displayed neither on the screen of the main display area nor on the screen of the sub display areas, a mode in which it is displayed only on the screen of the main display area, and a mode in which it is displayed on both the screens.

There is further included an image signal acquisition unit configured to acquire plural different image signals as origins of the plural thumbnail images through broadcast signals or Internet.

According to another embodiment of the invention, there are provided a generation unit configured to generate image signals for displaying plural screens on one display surface, and an operation signal acquisition unit configured to acquire an operation signal from a user, and a focused one of the plurality of screens is scaled when the operation signal common to the plurality of screens to scale the screen is acquired from the user.

As stated above, according to the embodiments of the invention, a desired screen can be quickly scaled.

DETAILED DESCRIPTION OF THE PREFERRED EMBODIMENTS

Hereinafter, embodiments of the present invention will be described with reference to the drawings.

Figure 1:
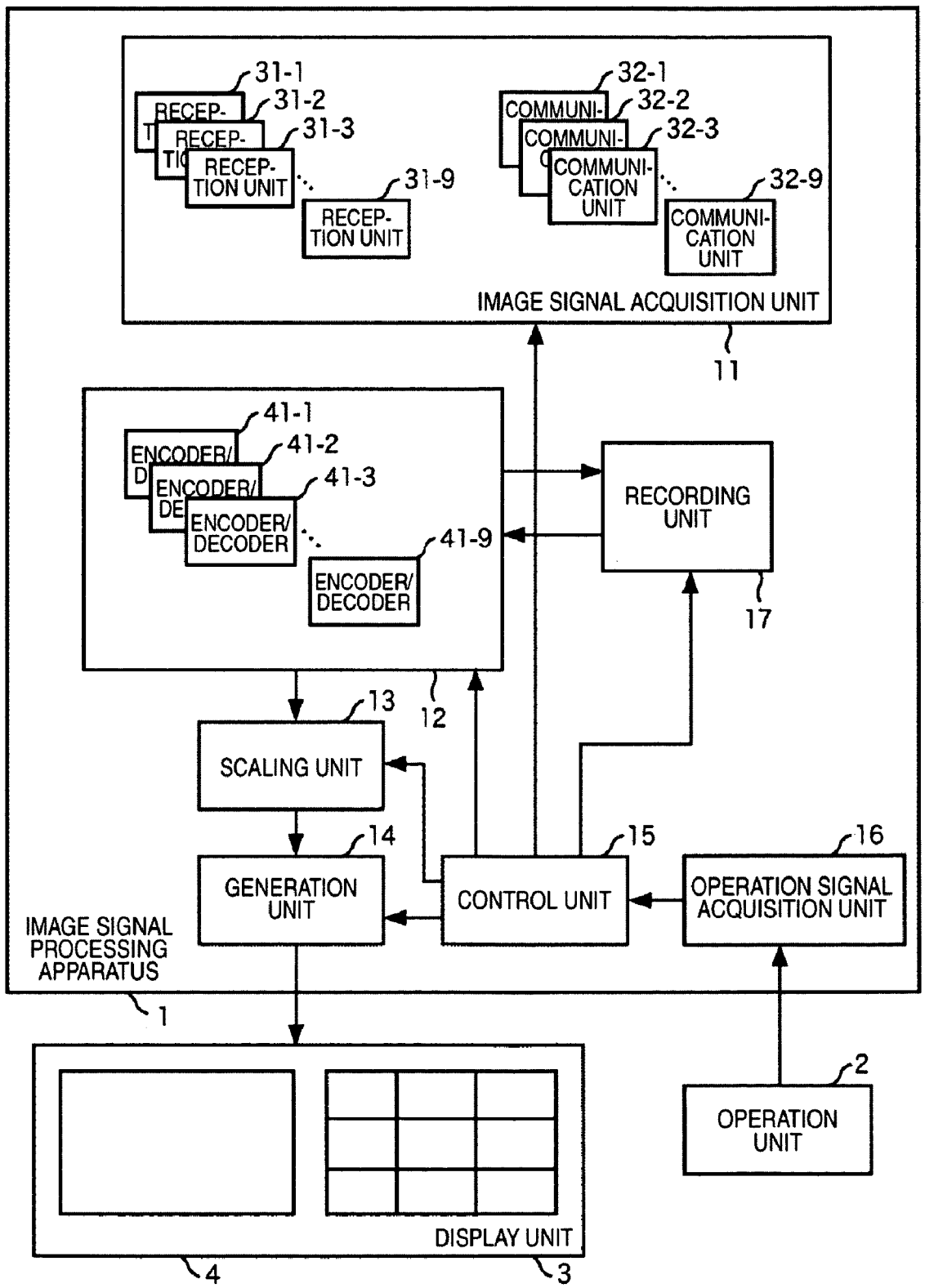
FIG. 1 is a block diagram showing a structure of an image processing apparatus of an embodiment of the invention.

FIG. 1 shows a structure of an image processing apparatus of an embodiment of the invention. This image processing apparatus 1 performs a specified process based on an operation signal from an operation unit 2 which is operated by a user, and displays an image on a display unit 3. The operation unit 2 includes, for example, a remote controller which is described later with reference to FIG. 2. Of course, the operation unit 2 may include various buttons and switches attached to a main body of the image processing apparatus 1.

The display unit 3 includes an LCD (Liquid Crystal Display), a CRT (Cathode Ray Tube), an organic EL (Electroluminescence) display, or a plasma display, and displays screens on one display surface 4. The display unit 3 incorporates a speaker (not shown) to output a sound.

The image processing apparatus 1 and the display unit 3 may be constructed integrally like a television receiver, or may be constructed separately like a tuner and a display.

The image processing apparatus 1 includes an image signal acquisition unit 11, a processing unit 12, a scaling unit 13, a generation unit 14, a control unit 15, an operation signal acquisition unit 16 and a recording unit 17. All of or part of the recording unit 17 can be constructed as a separate body from the main body of the image signal processing apparatus 1.

The image signal acquisition unit 11 includes plural reception units 31-1 to 31-9, and plural communication units 32-1 to 32-9. The processing unit 12 includes plural encoders/decoders 41-1 to 41-9. Incidentally, in the following, when it is not necessary to differentiate the respective units, they are simply referred to as the reception unit 31, the communication unit 32 or the encoder/decoder 41. The same is applied to other portions.

The reception units 31-1 to 31-9 have functions to independently and simultaneously receive image signals of different channels from broadcasting signals transmitted through ground waves, satellite broadcasting, communication satellites, or cables. The encoders/decoders 41-1 to 41-9 simultaneously and independently decode the image signals received by the reception units 31-1 to 31-9, and output them to the scaling unit 13. Accordingly, in the case of this embodiment, the image signals of content of nine channels in total can be simultaneously acquired. Of course, the number is arbitrary and is not limited to nine.

The encoders/decoders 41-1 to 41-9 have also functions to encode the image signals recorded on the recording unit 17. The image signals reproduced by the recording unit 17 are decoded by the encoders/decoders 41-1 to 41-9 and are outputted to the scaling unit 13.

The communication units 32-1 to 32-9 have functions to simultaneously receive different image signals through various networks typified by the Internet. Accordingly, the image signals of the nine different pieces of content can be acquired also through the network.

The scaling unit 13 scales each of the image signals of content of the nine channels decoded by the encoders/decoders 41-1 to 41-9 of the processing unit 12, and generates image signals of thumbnail images of moving images. The generation unit 14 generates the image signals for displaying plural screens on the one display surface 4. Specifically, the image signals of two screens of a main display area and a sub display area are generated (the display area will be described later with reference to FIG. 4). The generation unit 14 outputs the generated image signals to the display unit 3, and causes corresponding images to be displayed.

The control unit 15 controls the respective operations of the image signal acquisition unit 11, the processing unit 12, the scaling unit 13, the generation unit 14 and the recording unit 17.

The operation signal acquisition unit 16 acquires the operation signal from the user, which is supplied through infrared ray signals or the like from the operation unit 2 when the user operates the operation unit 2. The acquired operation signal is supplied to the control unit 15. The control unit 15 controls the operations of the respective units based on the operation signal.

The recording unit 17 includes a hard disk, an optical disk, a magneto-optical disk or a solid-state memory, and records the image signals acquired by the image signal acquisition unit 11. The recording unit 17 records a computer program when required.

Figure 2:
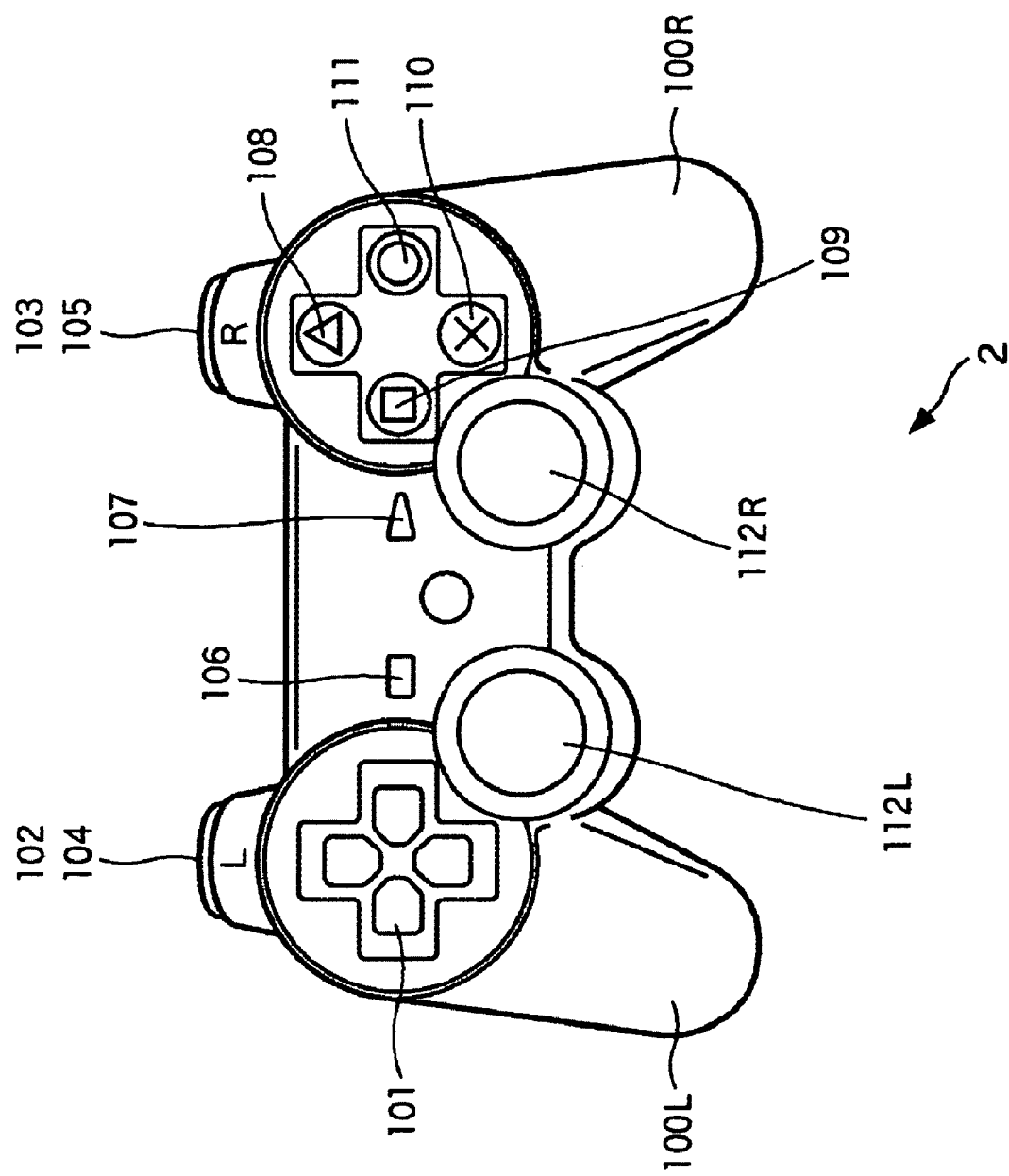
FIG. 2 is a plan view showing a structure of an operation unit of the embodiment.

FIG. 2 shows a structure of a remote controller as the operation unit 2 according to the embodiment. Grip parts 100L and 100R are held by the user's hands. A movement button 101 is operated by the user when a movement object such as a cursor is moved up, down, right or left. A L1 button 102 disposed at the end of the left grip part 100L and a R1 button 103 disposed at the end of the right grip part 100R are respectively operated when the sound volume is decreased or increased.

A L2 button 104 disposed below (in the back surface direction of the paper surface in FIG. 2) the L1 button 102 and a R2 button 105 disposed below (in the back surface direction of the paper surface in FIG. 2) the R1 button 103 function as right and left two-screen-size ratio change buttons. The L2 button 104 is operated when the screen of the main display area positioned at the left side of the display surface is scaled up, and the R2 button 105 is operated when the screen of the sub display area positioned at the right side of the display surface is scaled up.

The select button 106 functions as a progress bar display mode switching button and is operated when a progress bar display mode is switched. A start button 107 is operated when a scenario is changed. A triangular mark button 108 functions as a text information display mode switching button, and is operated when a text information display mode is switched. A square mark button 109 functions as a full-screen display switching button, is a button used in common to images of the main display area and the sub display area, and is operated when full-screen display is instructed or the end thereof is instructed.

A× mark button 110 is operated when the screen is returned. A circle mark button 111 functions as a decision button, and is operated when the selection of a thumbnail image to be displayed on full screen in the sub display area is decided. An analog stick 112L is operated to be tilted leftward when an image of the main display area positioned at the left side is enlarged, and is operated to be tilted rightward when an image of the sub display area positioned at the right side is enlarged. Further, the analog stick 112L is operated when the center position of the image enlarged in the main display area is changed. An analog stick 112R is operated when the enlargement ratio of the image of the main display area displayed on full screen is changed.

Next, an image display control process performed by the image processing apparatus 1 will be described with reference to a flowchart of FIG. 3. This process is started when the acquisition of image signals is instructed.

Figure 4:
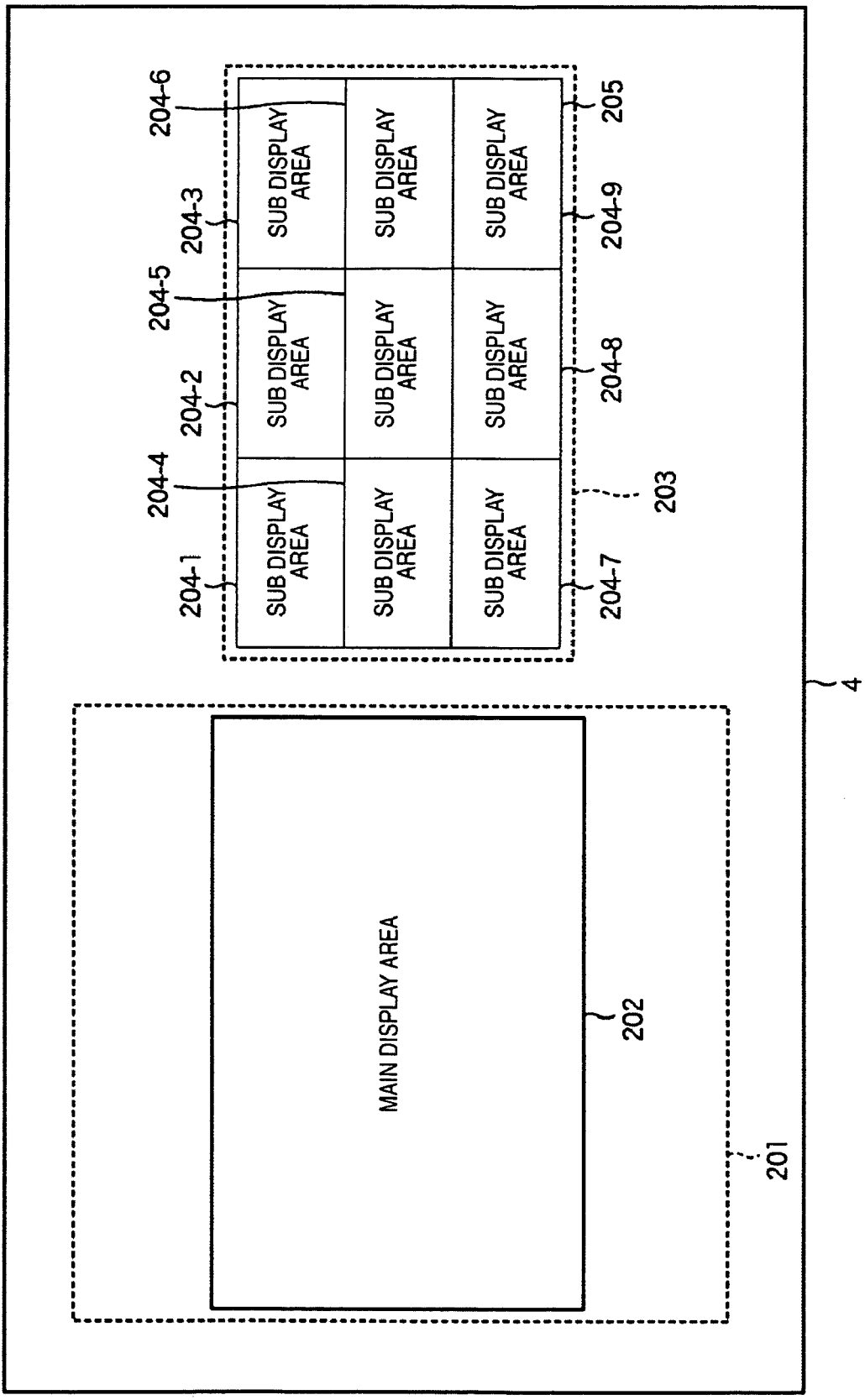
FIG. 4 is a view showing a state where right and left two images are displayed synchronously.

At step S1, the control unit 15 displays by default. In this embodiment, as shown in FIG. 4, the default state is the state in which a screen of a main display area 202 is displayed on the left side of the one display surface 4 of the display unit 3 and a screen of a sub display area 205 having the same size is displayed on the right side.

The sub display area 205 is divided into nine (3×3) display sub areas 204-1 to 204-9 in matrix form, and independent moving images are displayed as a multi-tile view 203 in the respective areas.

That is, the image signals of the different channels simultaneously received by the reception units 31-1 to 31-9 are decoded by the encoders/decoders 41-1 to 41-9. The scaling unit 13 scales (in this case, reduces) the nine image signals and generates image signals of the thumbnail images. Besides, the scaling unit 13 forms an image signal of an image displayed as a main moving image view 201 in the main display area 202 from an image signal of a channel of a thumbnail image selected from the nine thumbnail images. In this case, the image signal of the screen of an upper left sub display area 204-1 at the default position is made the image signal of the screen of the main display area 202.

The generation unit 14 generates the image signals of the one display surface 4 from the image signal of the screen of the main display area 202 and the image signals of the screen of the sub display area 205, and outputs them to the display unit 3. As a result, nine (for example, in analog broadcast, channels 1, 3, 4, 6, 8, 10, 12, 14 and 16) different thumbnail images of moving images are displayed in the sub display area 205, and one moving image selected therefrom is displayed as the image of the screen of the main display area 202.

Incidentally, the nine different image signals once recorded in the recording unit 17 are reproduced to display the thumbnail images in the sub display areas 204, and the image selected therefrom can also be displayed in the main display area 202.

At step S2, the control unit 15 determines whether the change of the right and left two-screen-size ratio is instructed. That is, when the ratio of the size of the screen of the left main display area 202 to the size of the screen of the right sub display area 205 is changed, the user operates the L2 button 104 or the R2 button 105. When the size of the screen of the main display area 202 is enlarged, the L2 button 104 is operated, and when the size of the screen of the right sub display area 205 is enlarged, the R2 button 105 is operated.

When the change of the ratio of the sizes of the right and left two screens is instructed (when the operation signal of the L2 button 104 or the R2 button 105 is acquired), the right and left two-screen-size ratio change process is performed at step S3.

Figure 5:
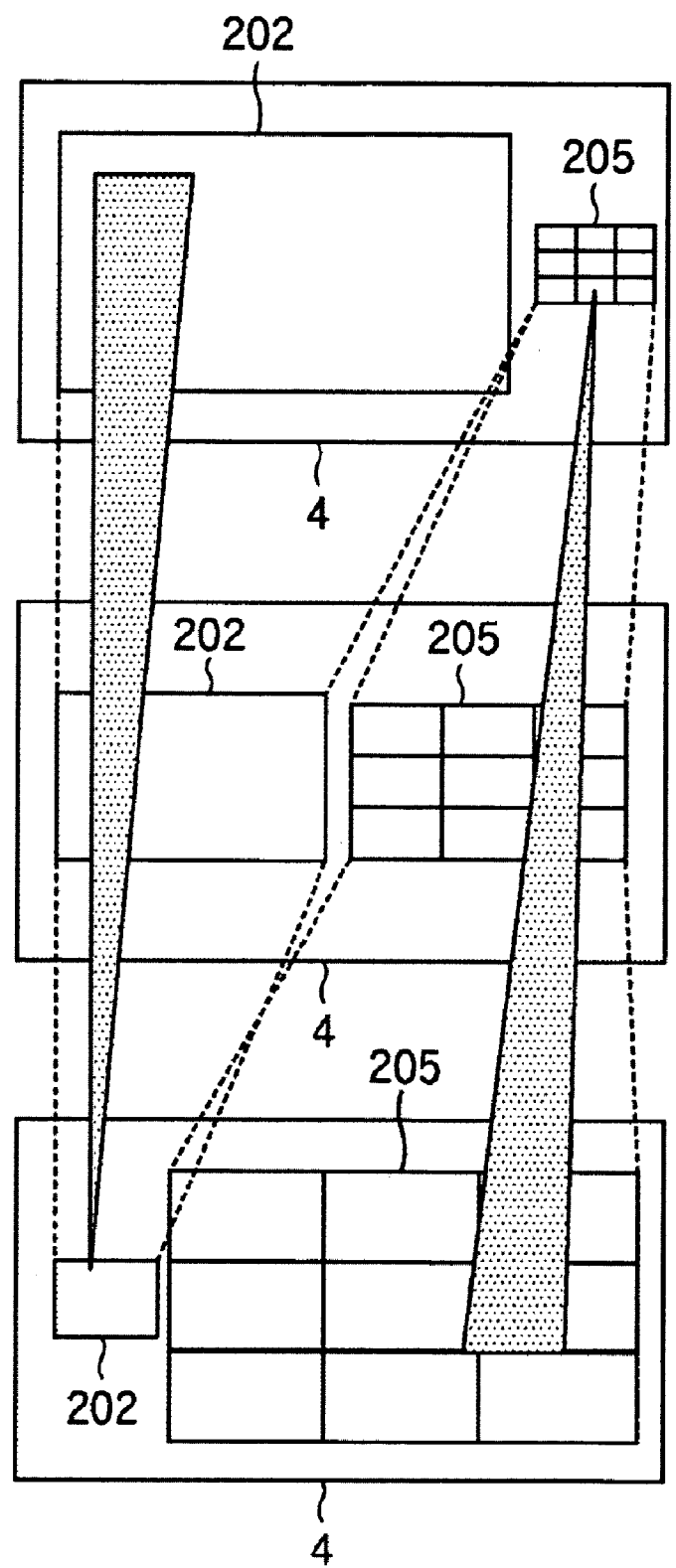
FIG. 5 is a view for explaining synchronous scaling of right and left two screens.

That is, as shown in the middle part of FIG. 5, when the L2 button 104 is operated in the state where the size of the screen of the main display area 202 is equal to that of the sub display area 205, as shown in the upper part, the size of the screen of the left main display area 202 is enlarged, and the size of the screen of the right sub display area 205 is reduced synchronously with it. When the R2 button 105 is operated in the state where the size of the screen of the main display area 202 is equal to that of the sub display area 205, as shown in the lower part, the size of the screen of the right sub display area 205 is enlarged, and the size of the screen of the left main display area 202 is reduced synchronously with it. The details thereof will be described later with reference to FIG. 12.

After the process of step S3, the process is returned to step S2, and the subsequent process is repeated.

At step S2, when it is determined that the change of the right and left two-screen-size ratio is not instructed, at step 4, the control unit 15 determines whether the change of the text information display mode is instructed. Specifically, it is determined whether the operation signal of the triangular mark button 108 as the text information display mode switching button to instruct the change of the text information display mode is acquired.

Figure 6:
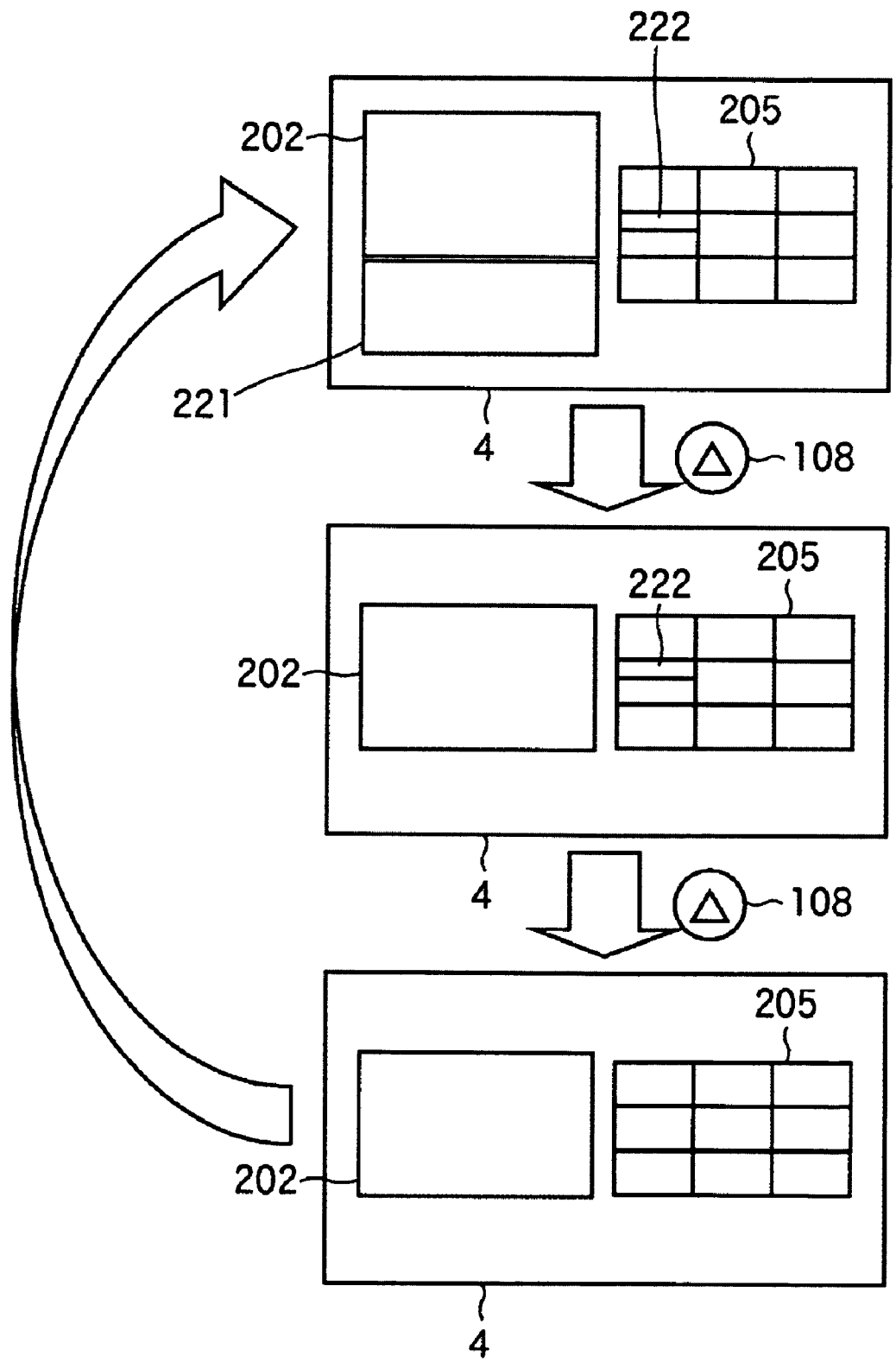
FIG. 6 is a view for explaining transition of text information display modes.

When it is determined that the change of the text information display mode is instructed, the text information display mode change process is performed at step S5. That is, as shown in FIG. 6, the text information display mode includes a mode in which a content metadata display area 221 as a text information display area is displayed in the main display area 202, and a content metadata display area 222 as a text information display area is displayed in the sub display area 205 (the mode in the upper part of FIG. 6), a mode in which the content metadata display area is not displayed in the main display area 202 and the content metadata display area 222 is displayed only in the sub display area 205 (the mode in the middle part of FIG. 6), and a mode in which the content metadata display area is displayed neither in the main display area 202 nor in the sub display area 205 (the mode in the lower part of FIG. 6). The three modes sequentially and circularly transition each time the operation signal of the triangular mark button 108 is acquired. The details thereof will be described later with reference to FIG. 15.

After the process of step S5, the process is returned to step S4, and the subsequent process is repeated.

At step S4, when it is determined that the change of the text information display mode is not instructed, at step S6, the control unit 15 determines whether the change of the progress bar display mode is instructed. Specifically, it is determined whether the operation signal of the select button 106 as the progress bar display mode switching button to instruct the progress bar display mode is acquired.

Figure 7:
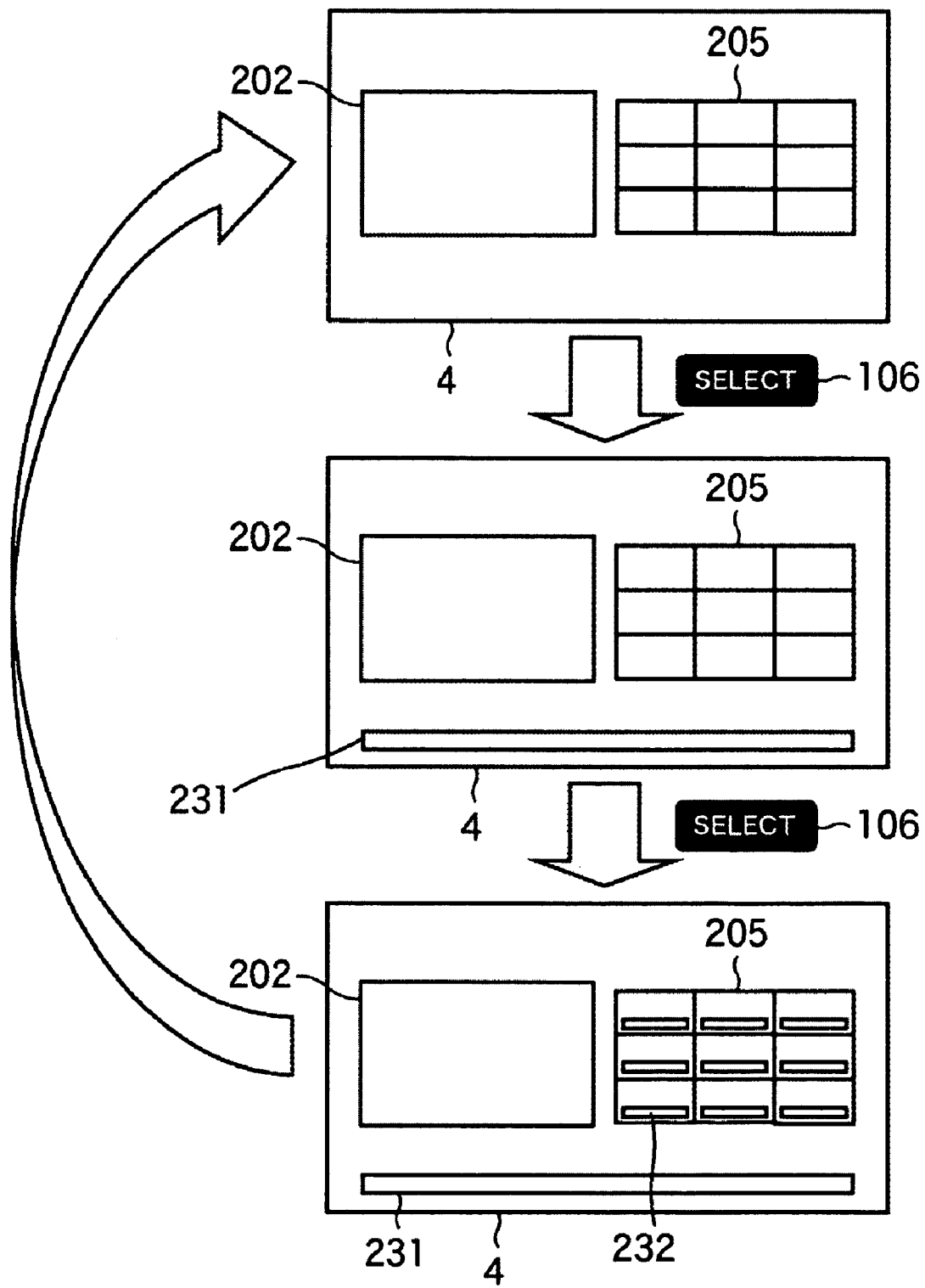
FIG. 7 is a view for explaining transition of progress bar display modes.

When it is determined that the change of the progress bar display mode is instructed, at step S7, the progress bar display mode change process is performed. That is, as shown in FIG. 7, the progress bar display mode includes a mode in which a progress bar display area 231 is displayed in the main display area 202, and a progress bar display area 232 is displayed in the sub display area 205 (mode in the lower part of FIG. 7), a mode in which the progress bar display area is displayed neither in the main display area 202 nor in the sub display area 205 (mode in the upper part of FIG. 7), and a mode in which the progress bar display area 231 is displayed in the main display area 202, and the progress bar display area is not displayed in the sub display area 205 (mode in the middle part of FIG. 7). The three modes sequentially and circularly transition each time the operation signal of the select button 106 is acquired. The details thereof will be described later with reference to FIG. 18.

After the process of step S7, the process is returned to step S6, and the subsequent process is repeated.

At step S6, when it is determined that the change of the progress bar display mode is not instructed, at step S8, the control unit 15 determines whether an operation signal of scaling common to the respective display areas is acquired. In the case of this embodiment, the button used for the instruction of scaling common to the main display area 202 and the sub display area 205 is the square mark button 109 as the full-screen display switching button. Then, it is determined whether the operation signal of the square mark button 109 is acquired.

When the operation signal of the square mark button 109 is acquired, at step 9, the control unit 15 determines whether the main display area is focused. Whether the main display area 202 is focused can be determined by, for example, whether the cursor is positioned in the main display area 202. This point will be described later with reference to FIG. 10.

Figure 8:
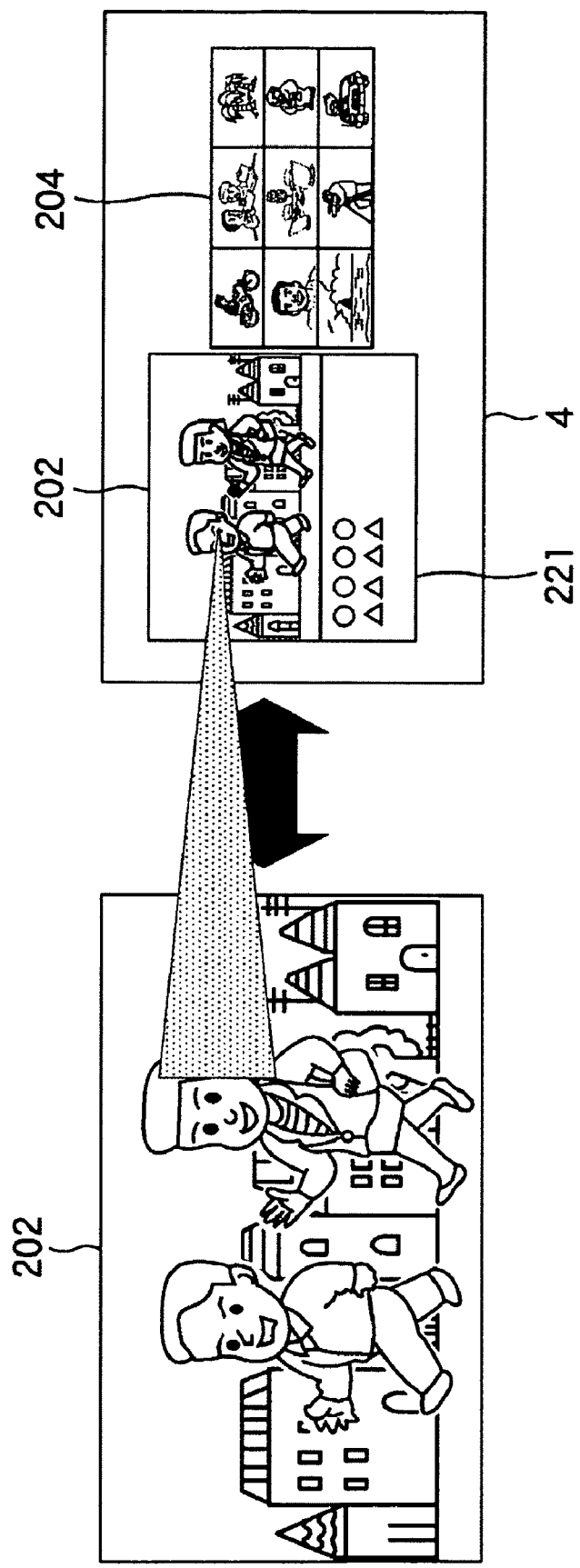
FIG. 8 is a view for explaining full-screen display of a main display area.

When the main display area 202 is focused, at step S10, the control unit 15 performs a main display area full-screen display process. That is, as shown in FIG. 8, when the operation signal of the square mark button 109 used for the instruction of scaling common to the main display area 202 and the sub display area 205 is acquired in the state where the main display area 202 is focused, the display of the screen of the sub display area 205 is erased, and the screen of the main display area 202 is displayed to be large on the whole screen of the display surface 4. The details thereof will be described with reference to FIG. 21.

At step S9, when it is determined that the main display area 202 is not focused, at step S11, the control unit 15 determines whether the sub display area is focused. Also in this case, it is determined that when the cursor is positioned in the sub display area 205, the sub display area 205 is focused.

Figure 9:
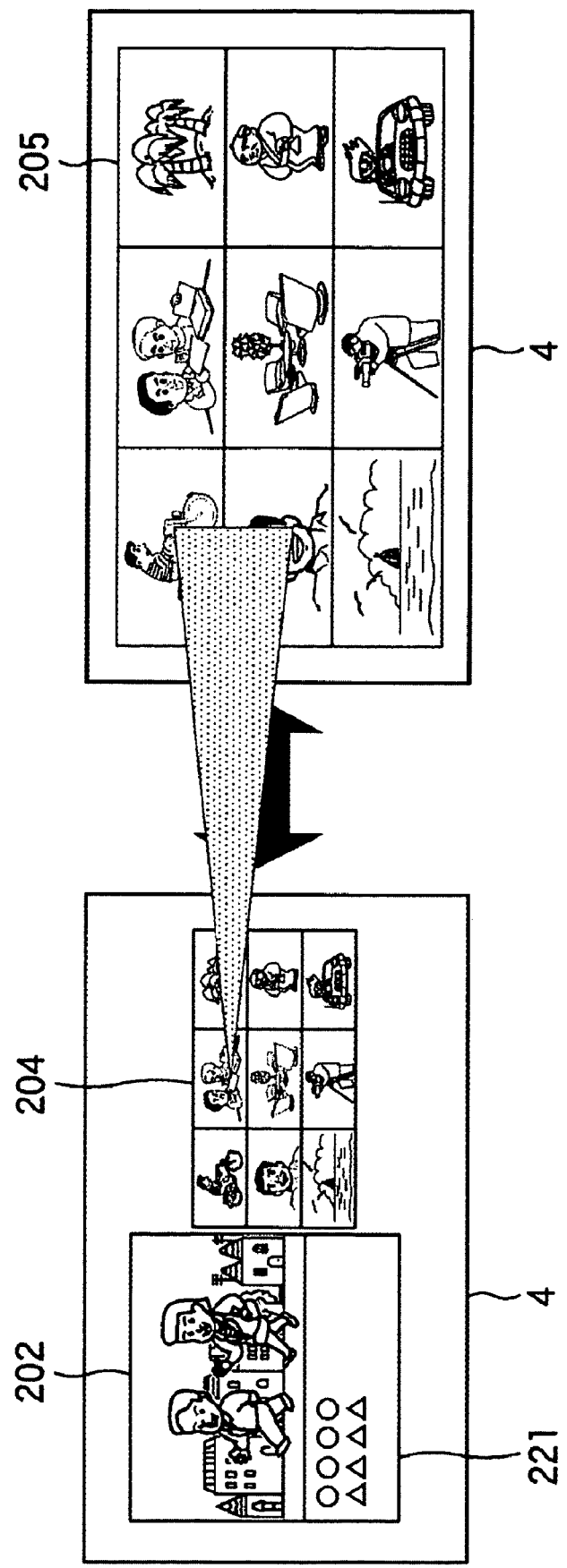
FIG. 9 is a view for explaining full-screen display of a sub display area.

When the sub display area 205 is focused, at step S12, the control unit 15 performs the sub display area full-screen display process. That is, as shown in FIG. 9, when the operation signal of the square mark button 109 used for the instruction of scaling common to the main display area 202 and the sub display area 205 is acquired in the state where the sub display area 205 is focused, the display of the screen of the main display area 202 is erased, and the screen of the sub display area 205 is displayed to be large on the whole screen of the display surface 4. The details thereof will be described later with reference to FIG. 24.

At step S8, when it is determined that the operation signal of scaling common to the respective display areas is not acquired, after the process of step S10, after the process of step S12, or when it is determined at step S11 that the sub display area is not focused, the control unit 15 determines at step S13 whether the power is turned off. When the power is not turned off, the process is returned to step S2, and the subsequent process is repeated. When it is determined that the power is turned off, the process is ended.

Figure 10:
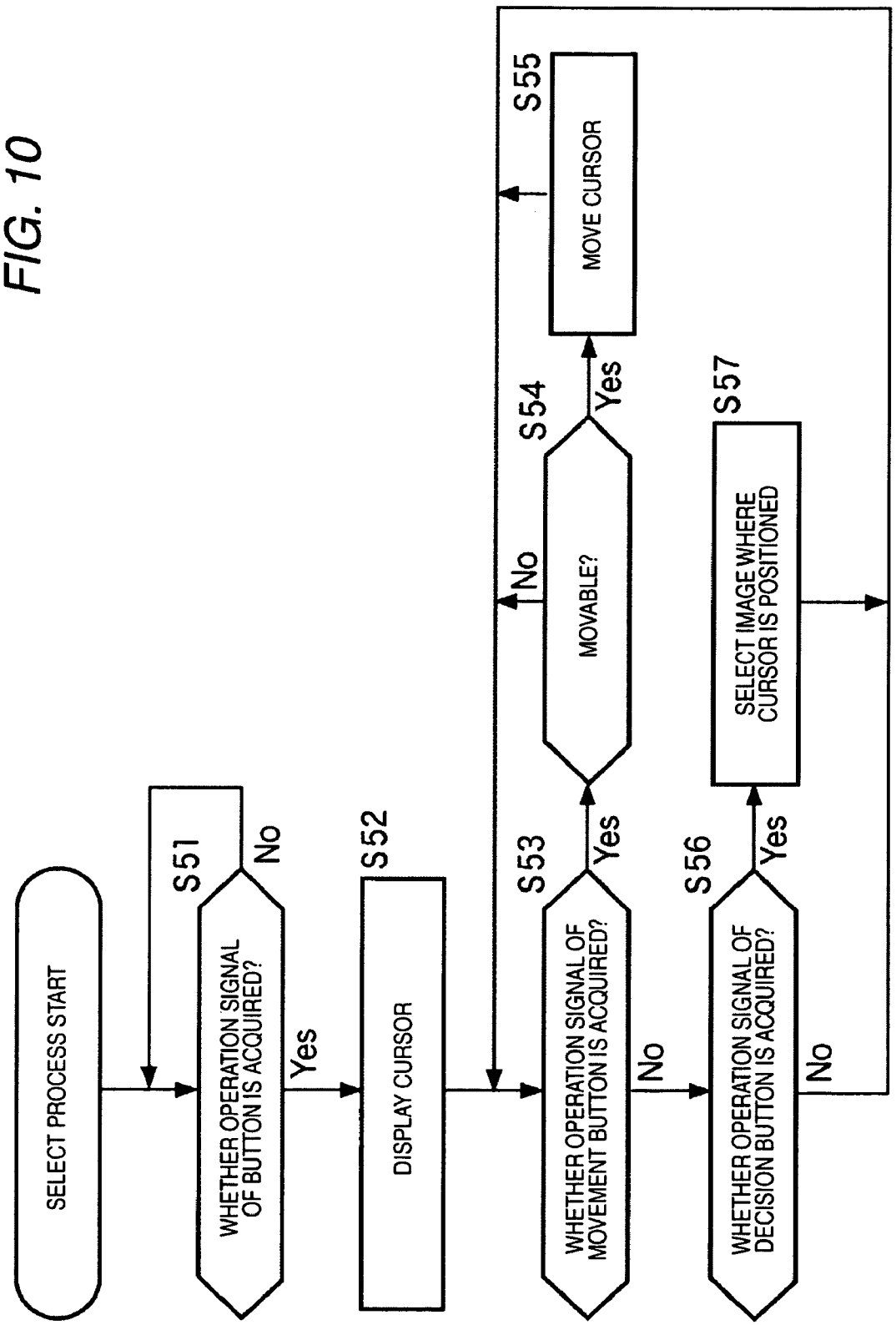
FIG. 10 is a flowchart for explaining a selection process.

Here, a process in a case where the user selects specified information from images displayed on the screen will be described with reference to a flowchart of FIG. 10.

Figure 11:
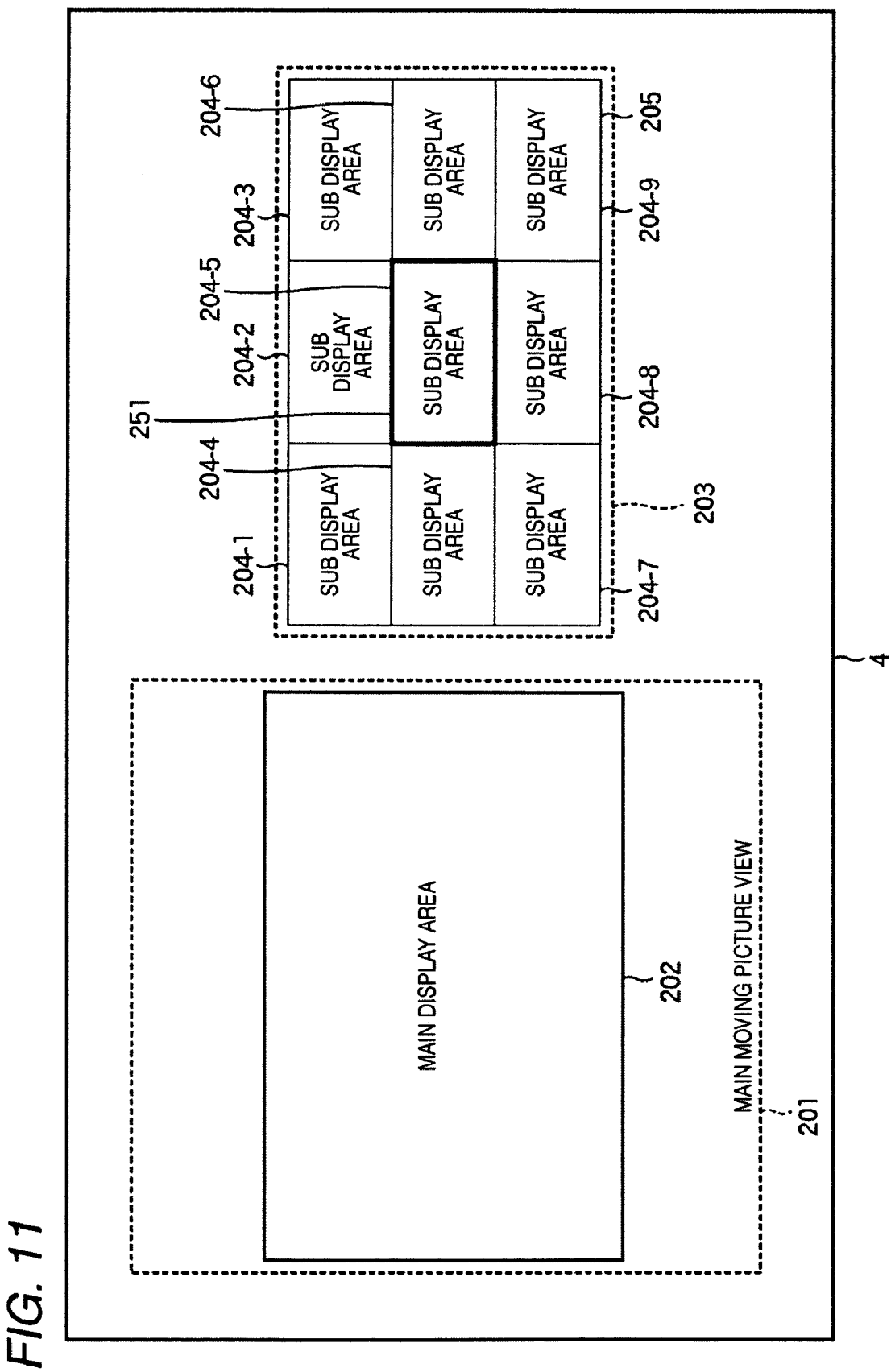
FIG. 11 is a view for explaining focusing.

At step S51, the control unit 15 determines whether the operation signal of the button is acquired from the operation signal acquisition unit 16. When the operation signal is not acquired, the determination process is repeated until the signal is acquired. When the operation signal is acquired, the control unit 15 displays the cursor at step S52. FIG. 11 shows a state where a cursor 251 is displayed in this way. In the case of this embodiment, a position of a sub display area 204-5 at the center of the 3×3 multi-tile view 203 is the default position where the cursor 251 is displayed.

At step S53, the control unit 15 determines whether the operation signal of the movement button is acquired. That is, since the movement button 101 is operated when the cursor 251 is moved, it is determined whether the operation signal is acquired.

When the operation signal of the movement button 101 is acquired, the control unit 15 determines at step S54 whether the cursor can be moved. When the cursor can be moved, the control unit 15 moves the cursor at step S55. On the other hand, when it is difficult to move the cursor 251, the cursor 251 is not moved.

After the process of step S55, or when it is determined at step S54 that it is difficult to move the cursor 251, the process is returned to step S53, and the subsequent process is repeated.

For example, when the movement of the cursor 251 in the right direction is instructed in the state of FIG. 11, the cursor 251 is moved to the right sub display area 204-6. When the rightward movement of the cursor is further instructed in that state, since there is no movement destination on the right side, it is determined that it is difficult to move the cursor 251, and the cursor is not moved.

When the movement in the left direction is instructed in the state of FIG. 11, the cursor 251 is moved to the position of the sub display area 204-4, and when the leftward movement from the position is further instructed, the cursor 251 is moved to the main display area 202. When there is an up, down, right or left movement destination in the inside of the main display area 202, the cursor is moved to each position.

At step S53, when it is determined that the operation signal of the movement button 251 is not acquired, at step S56, the control unit 15 determines whether the operation signal of the decision button is acquired. In the case of this embodiment, the decision button is the circle mark button 111. For example, when the cursor 251 is moved to a specified position and the image at that position is selected, the user operates the circle mark button 111 as the decision button and decides the selection.

At step S56, when it is determined that the operation signal of the circle mark button 111 is acquired, at step S57, the control unit 15 selects the image where the cursor is positioned. For example, when the circle mark button 111 is operated in the state shown in FIG. 11, the thumbnail image of the sub display area 204-5 is selected, and is displayed in the main display area 202. When the text information display mode or the progress bar display mode is set, the text information or the progress bar corresponding to the content metadata display area 221 or the progress bar display area 231 is displayed. Incidentally, the display of the thumbnail image of the sub display area 204-5 is continued as it is.

At step S56, when it is determined that the operation signal of the circle mark button 111 is not acquired, or after the process of step S57, the process is returned to step S53, and the subsequent process is repeated.

The control unit 15 determines that one of the main display area 202 and the sub display area 205 in which the cursor 251 is displayed is the display area now focused by the user.

Figure 12:
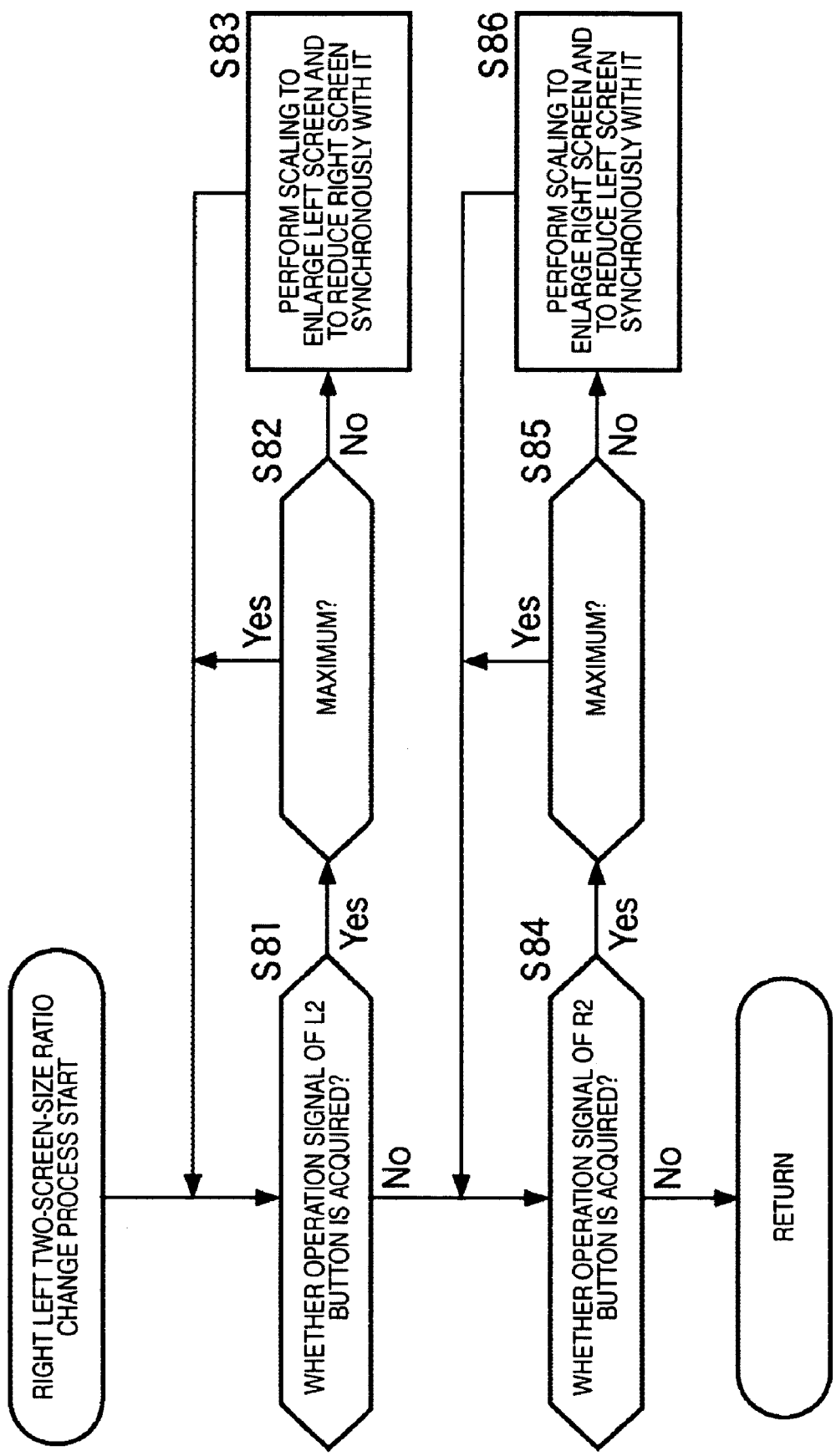
FIG. 12 is a flowchart for explaining a right and left two-screen-size ratio change process.

Next, the details of the right and left two-screen-size ratio change process of step S3 of FIG. 2 will be described with reference to FIG. 12.

The L2 button 104 is the button operated when scaling is performed so that the screen of the main display area 202 positioned on the left side is enlarged and the screen of the sub display area 205 positioned on the right side is reduced synchronously with it. The R2 button 105 is the button operated when scaling is performed so that the screen of the sub display area 205 positioned on the right side is enlarged and the screen of the main display area 202 positioned on the left side is reduced synchronously with it. That is, the operation signal of the L2 button 104 is an individual operation signal to scale the screen of the main display area 202 synchronously with the screen of the sub display area 205. The operation signal of the R2 button 105 is an individual operation signal to scale the screen of the sub display area 205 synchronously with the main display area 202.

At step S81, the control unit 15 determines whether the operation signal of the L2 button is acquired. When the individual operation signal of the L2 button 104 is acquired, at step S82, the control unit 15 determines whether the screen of the main display area 202 is maximum. When the screen is not maximum, at step S83, the control unit 15 scales up the left screen to a large size, and scales down the right screen to a small size synchronously with it. Specifically, the screen of the main display area 202 positioned on the left side is enlarged, and the screen of the sub display area 205 positioned on the right side is reduced synchronously with it.

While the user is operating the L2 button 104, the scaling is performed, and when the operation is stopped, the scaling is stopped. Accordingly, the user can adjust the size of the screen of the main display area 202 to an arbitrary size by adjusting the operation period of the L2 button 104. When the screen of the main display area 202 is already maximum, since it is difficult to further enlarge the screen, the process of step S83 is not performed.

After the process of step S83, or when it is determined at step S82 that the screen of the main display area 202 is maximum, the process is returned to step S81, and the subsequent process is repeated.

The process is similarly performed also when the operation signal to tilt the analog stick 112L to the left.

At step S81, when it is determined that the operation signal of the L2 button 104 is not acquired, at step S84, the control unit 15 determines whether the operation signal of the R2 button is acquired. When the individual operation signal of the R2 button 105 is acquired, at step S85, the control unit 15 determines whether the screen of the sub display area 205 is maximum. When the screen is not maximum, at step S86, the control unit 15 scales up the right screen to a large size, and scales down the left screen synchronously with it.

Specifically, the screen of the sub display area 205 positioned on the right side is enlarged, and the screen of the main display area 202 positioned on the left side is reduced synchronously with it. While the user is operating the R2 button 105, the scaling is performed, and when the operation is stopped, the scaling is stopped. Accordingly, the user can adjust the size of the sub display area 205 to an arbitrary size by adjusting the operation period of the R2 button 105. When the screen of the sub display area 205 is already maximum, since it is difficult to further enlarge the screen, the process of step S86 is not performed.

After the process of step S86, or when it is determined at step S85 that the screen of the sub display area 205 is maximum, the process is returned to step S84, and the subsequent process is repeated.

Figure 13:
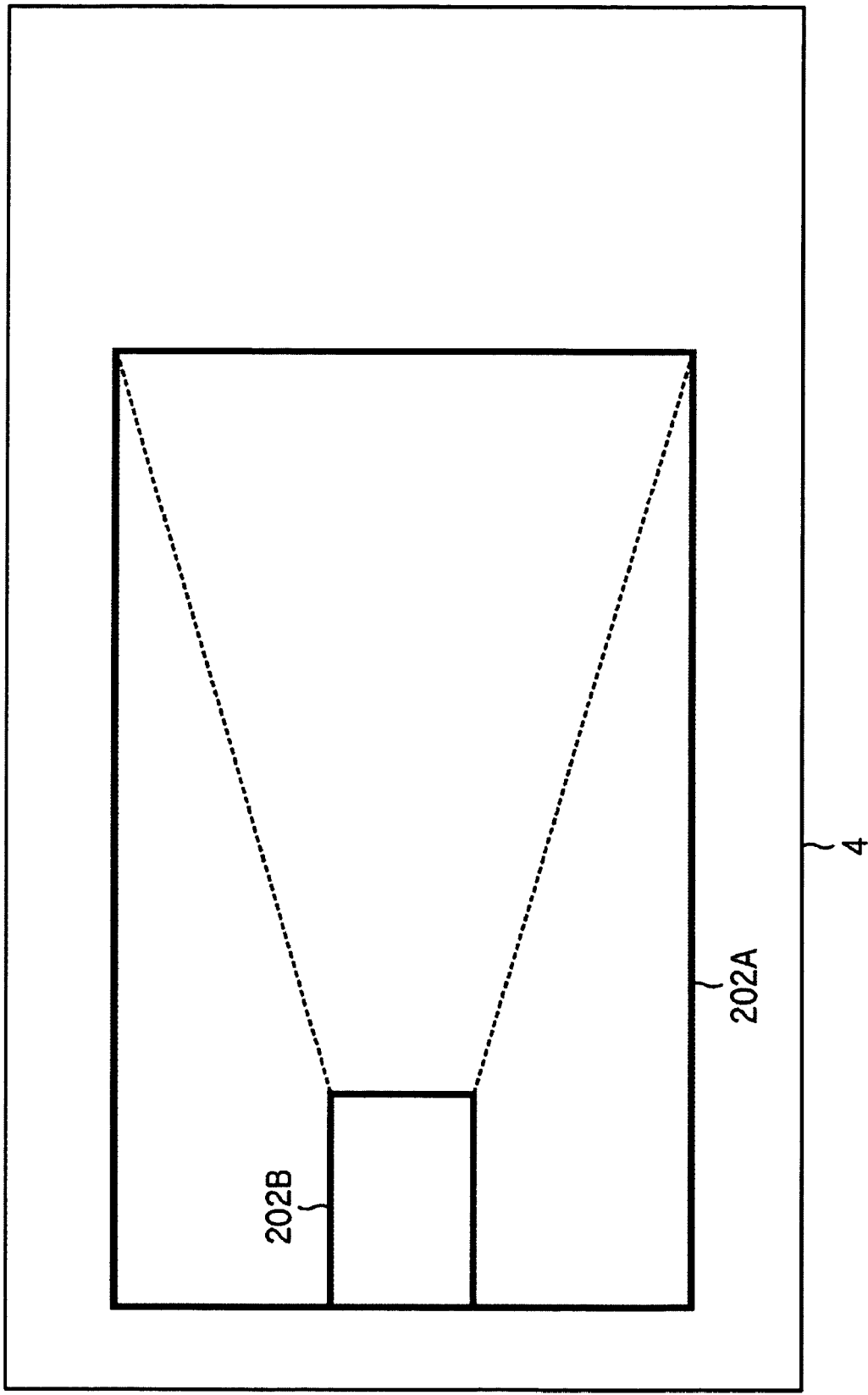
FIG. 13 is a view for explaining scaling of a screen of a main display area at the time of right and left two-screen synchronous display.

As stated above, as shown in FIG. 13, the main display area 202 has an arbitrary size between a maximum size main display area 202A and a minimum size main display area 202B. In FIG. 13, the sub display area 205 is omitted.

Figure 14:
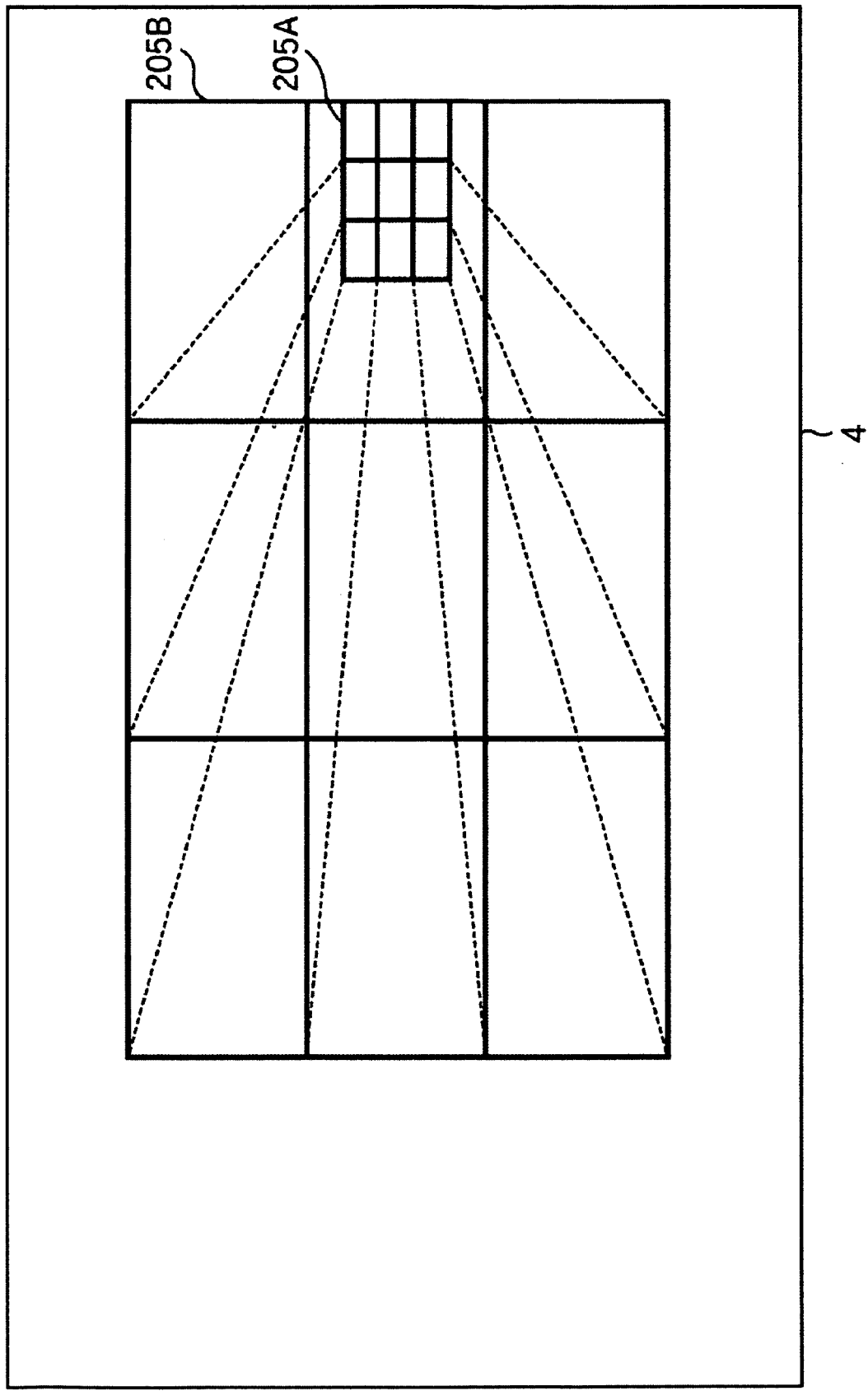
FIG. 14 is a view for explaining scaling of a screen of a sub display area at the time of right and left two-screen synchronous display.

Similarly, as shown in FIG. 14, the sub display area 205 has an arbitrary size between a screen of a maximum size sub display area 205B and a screen of a minimum size sub display area 205A. In FIG. 14, the main display area 202 is omitted.

Incidentally, the process of step S84 to S86 is similarly performed also when the operation signal to tilt the analog stick 112L to the right is acquired.

As stated above, the screen of the main display area 202 and the screen of the sub display area 205 are not independently scaled according to the respective operations, but they are scaled synchronously with each other such that when one of them is enlarged, the other is reduced. Thus, it is prevented that the two screens overlap with each other and become hard to see. Besides, not only the user can enjoy two pieces of content displayed on the two screens simultaneously and in parallel, but also the user can selectively enjoy one of the two pieces of content by the simple operation at an arbitrary timing when necessary.

Figure 15:
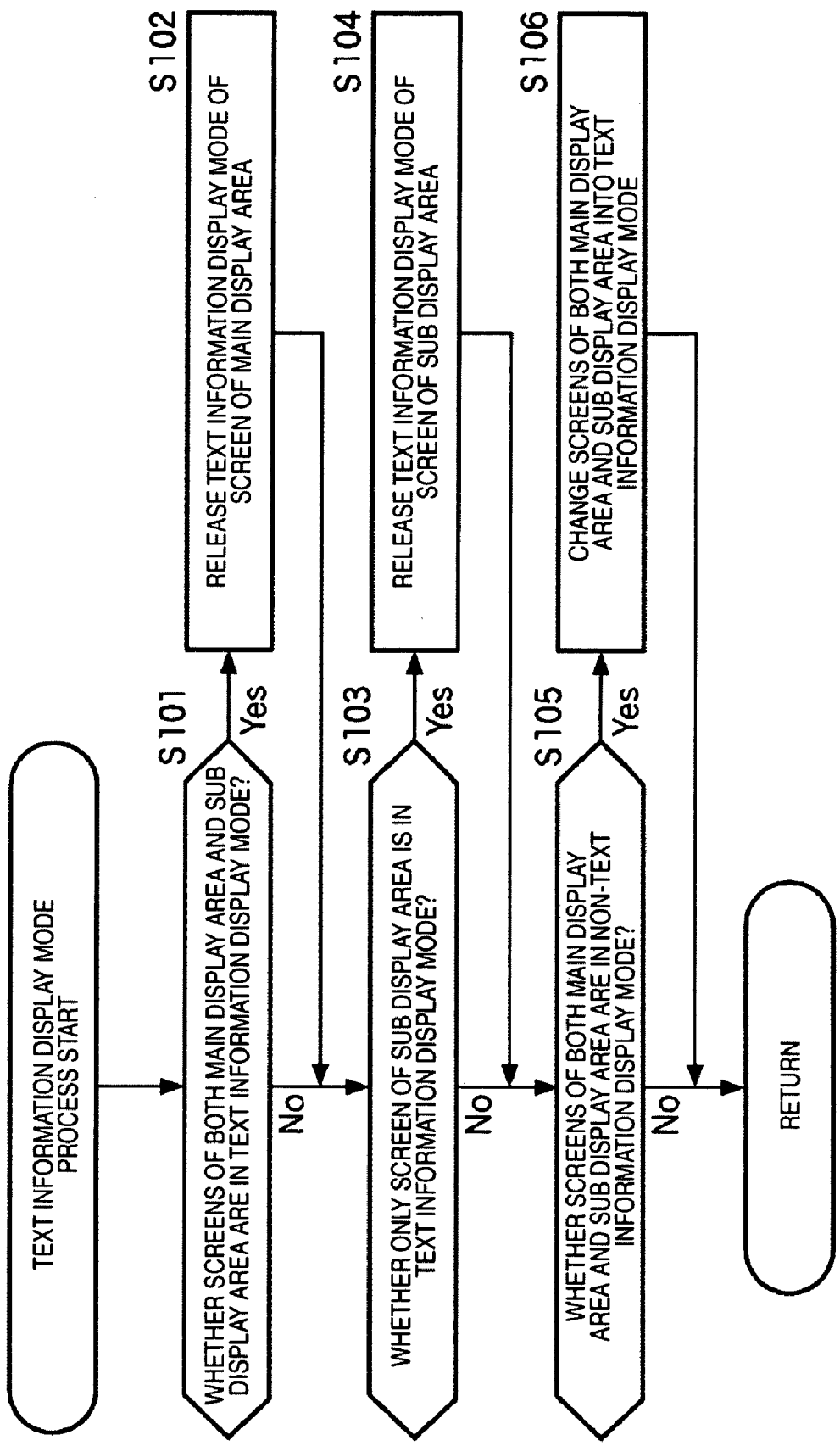
FIG. 15 is a flowchart for explaining a text information display mode process.

Next, the details of the text information display mode process of step S5 of FIG. 3 will be described with reference to FIG. 15. The process of FIG. 15 is performed when it is determined at step S4 of FIG. 3 that the change of the text information display mode is instructed.

Figure 16:
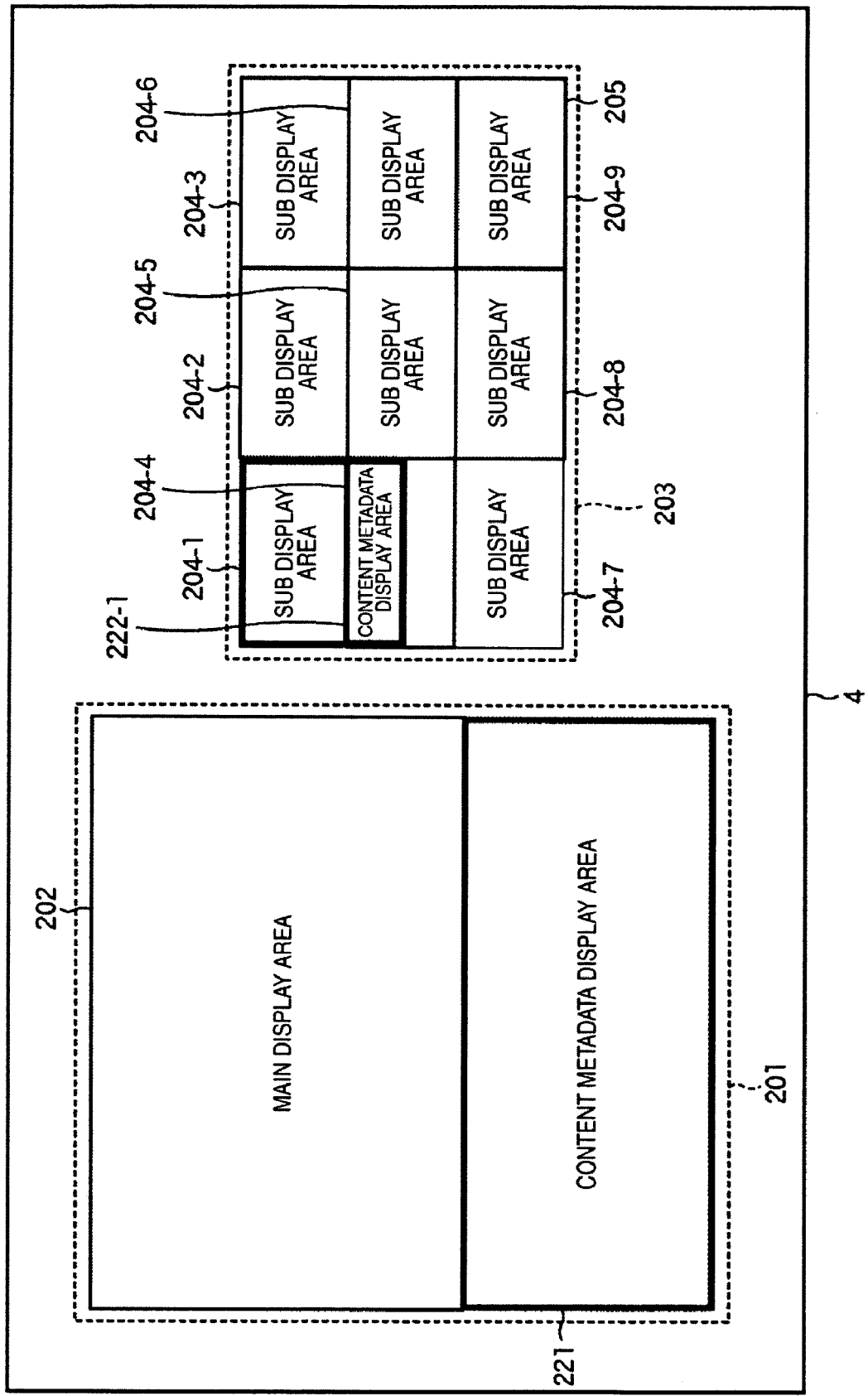
FIG. 16 is a view showing a state in which a content metadata display area is displayed.

At step S101, the control unit 15 determines whether the screens of both the main display area and the sub display area are in the text information display mode. When the screens of both the main display area 202 and the sub display area 205 are in the text information display mode, as shown in FIG. 16, the content metadata display area 221 is displayed below the screen of the main display area 202, and the content metadata display area 222-1 is displayed below the sub display area 204-1. The text information provided to the user as the metadata associated with the corresponding images is displayed in the content metadata display areas 221 and 222. For example, EPG (Electronic Program Guide) program information of the program is displayed.

As is apparent from the comparison between FIG. 16 and FIG. 4, in the case where the content metadata display area 221 is not displayed (case of FIG. 4), the screen of the main display area 202 is displayed so that the center thereof in the height direction is located at the position (almost the center position of the display surface 4 in the vertical direction) of almost the same height as the center of the screen of the sub display area 205 in the height direction. By this, the user can see the screen of the main display area 202 and the screen of the sub display area 205 from the line of sight of the same height, and it becomes unnecessary to move up and down the line of sight between the case where the screen of the main display area 202 is seen and the case where the screen of the sub display area 205 is seen, and they becomes easy to see.

On the other hand, when the content metadata display area 221 is displayed (case of FIG. 16), the center, in the height direction, of the screen including both the main display area 202 and the content metadata display area 221 is located at the position of almost the same height as the center, in the height direction, of the screen of the sub display area 205. As a result, it becomes unnecessary to move up and down the line of sight between the case where the screen of the left main display area 202 and the content metadata display area 221 are seen and the case where the screen of the right sub display area 205 is seen, and they become easy to see.

Incidentally, in FIG. 16, although not shown, corresponding content metadata display areas 222-2 to 222-9 are displayed below the other sub display areas 204-2 to 204-9.

Figure 17:
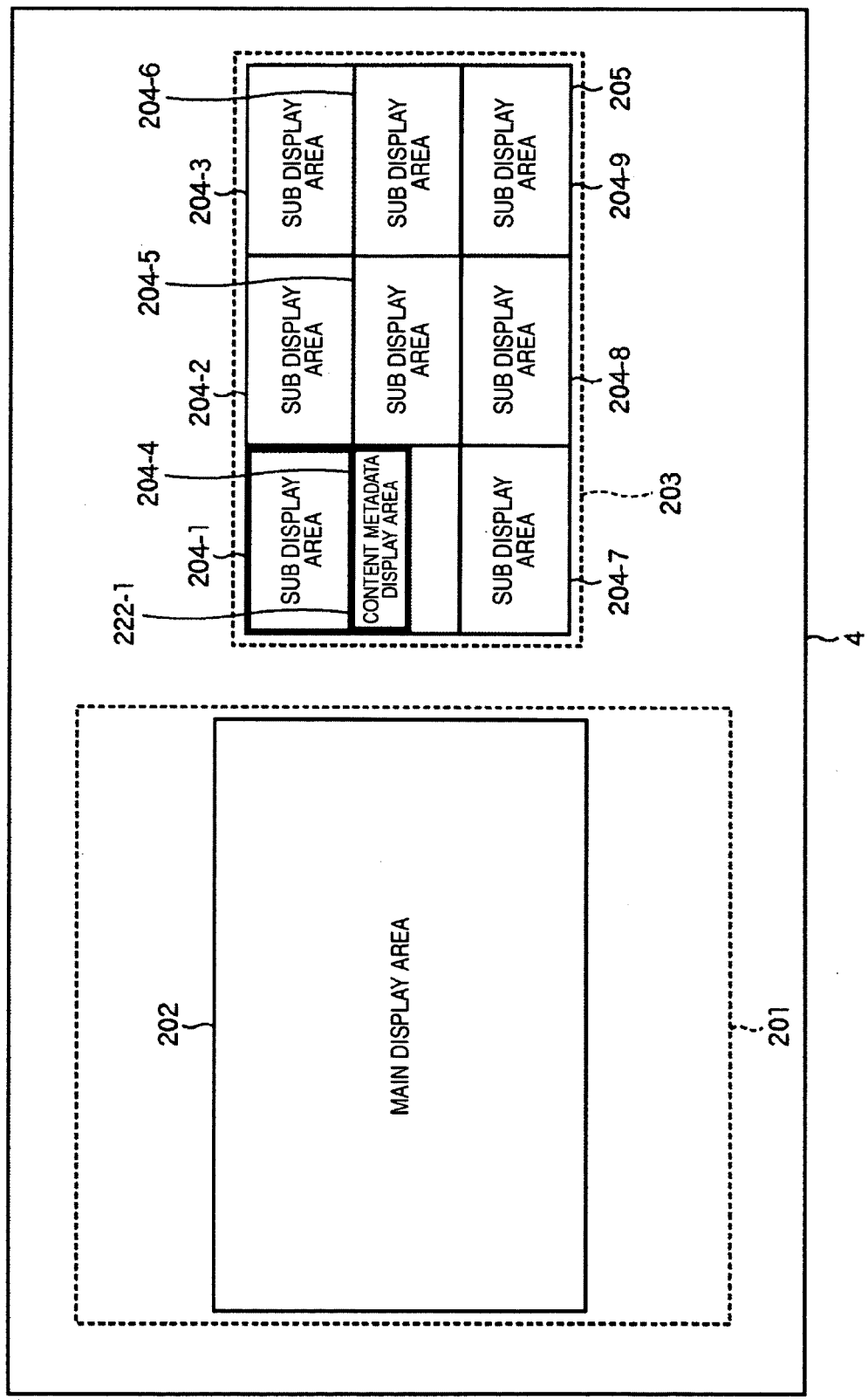
FIG. 17 is a view showing another state in which content metadata display area is displayed.

When the screens of both the main display area 202 and the sub display area 205 are in the text information display mode, at step S102, the control unit 15 releases the text information display mode of the main display area. As a result, as shown in FIG. 17, the display of the content metadata display area 221 of the screen of the main display area 202 is erased, and there occurs a state in which only the content metadata display area 222-1 of the sub display area 204-1 is displayed.

At step S101, when it is determined that neither the screen of the main display area 202 nor the screen of the sub display area 205 is in the text information display mode, or after the process of step S102, the control unit 15 determines at step S103 whether only the screen of the sub display area 205 is in the text information display mode. As shown in FIG. 17, when only the screen of the sub display area 205 is in the text display mode, at step S104, the control unit 15 releases the text information display mode of the screen of the sub display area. As a result, as shown in FIG. 4, there occurs a state where the display of both the content metadata display area 221 of the screen of the main display area 202 and the content metadata display area 222-1 of the sub display area 204-1 is erased.

At step S103, when it is determined that only the screen of the sub display area 205 is not in the text display mode, or after the process of step S104, the control unit 15 determines at step S105 whether the screens of both the main display area and the sub display area are in a non-text information display mode. As shown in FIG. 4, when the screens of both the main display area 202 and the sub display area 205 are in the non-text information display mode, at step S106, the control unit 15 puts the screens of both the main display area and the sub display area into the text information display mode. As a result, as shown in FIG. 16, there occurs a state where both the content metadata display area 221 of the screen of the main display area 202 and the content metadata display area 222-1 of the sub display area 204-1 are displayed.

Figure 3:
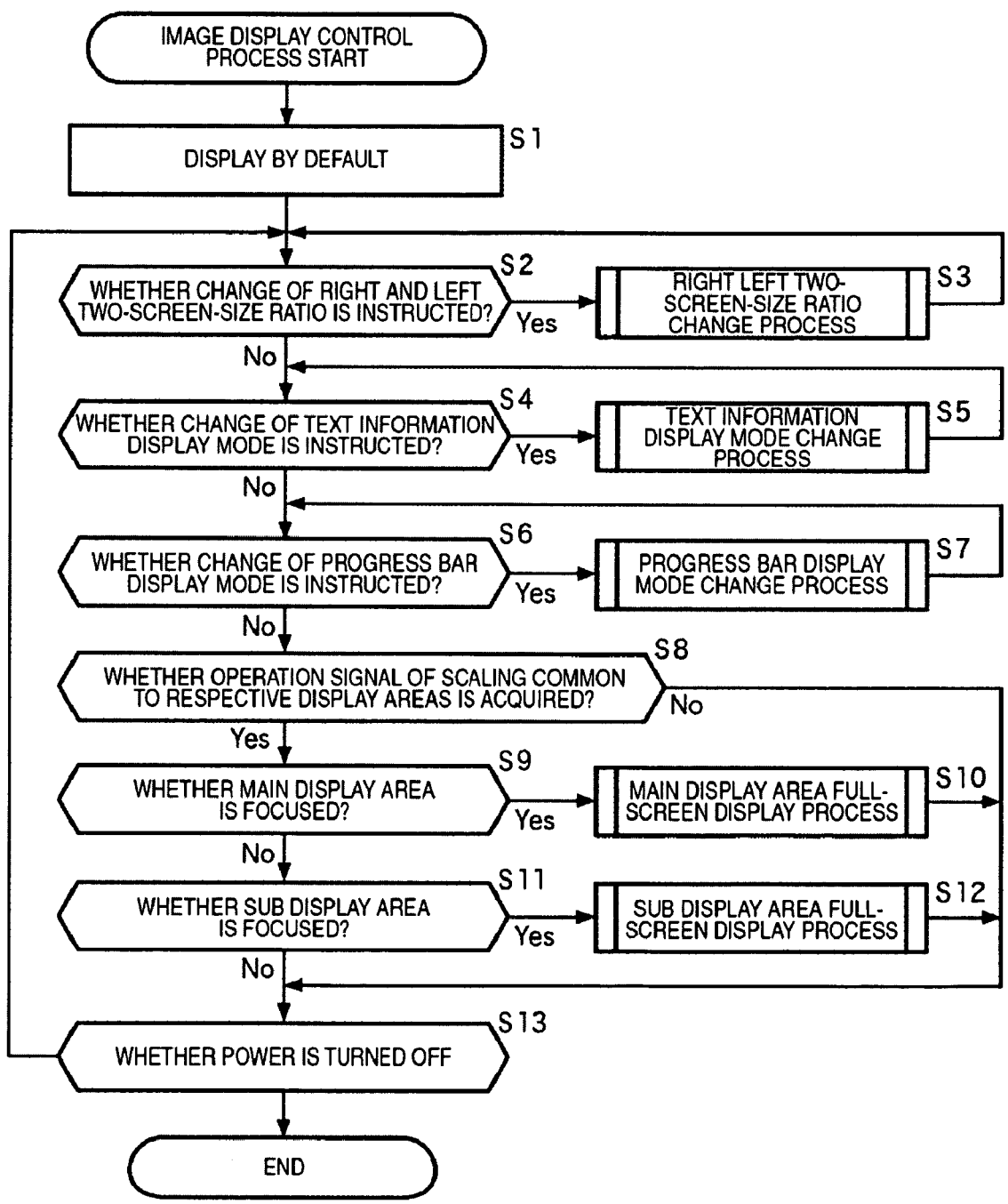
FIG. 3 is a flowchart for explaining an image display control process.

At step S105, when it is determined that neither the screen of the main display area 202 nor the screen of the sub display area 205 is in the non-text information display mode, or after the process of step S106, the process is returned to step S5 of FIG. 3.

As a result of the above process, as shown in FIG. 6, the mode in which the screens of both the main display area 202 and the sub display area 205 are in the text information display mode, the mode in which only the screen of the sub display area 205 is in the text information display mode, and the mode in which the screens of both the main display area 202 and the sub display area 205 are in the non-text information display mode are sequentially switched each time the user operates the triangular mark button 108 as the text information display mode switching button.

Figure 18:
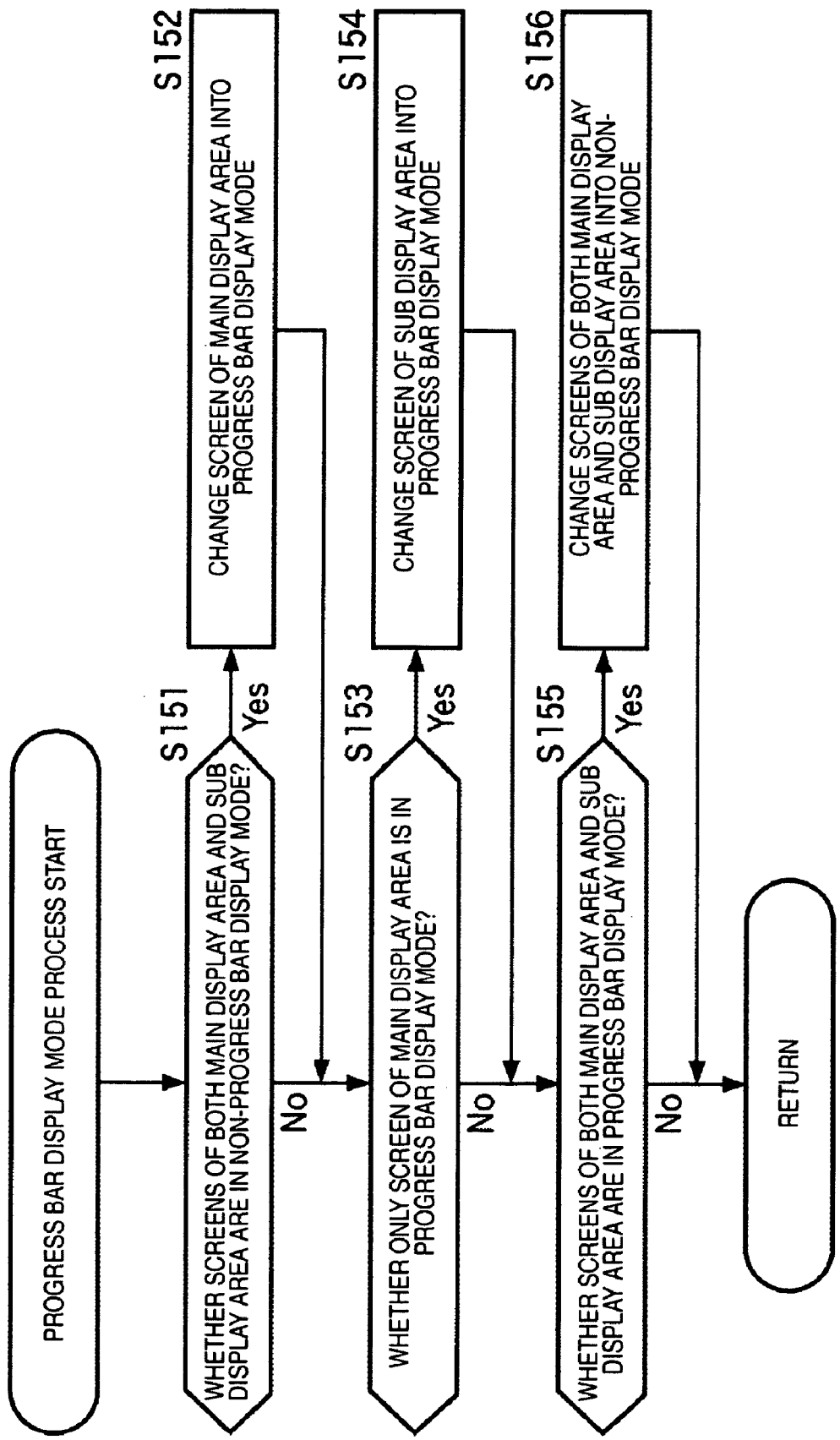
FIG. 18 is a flowchart for explaining a progress bar display mode process.

Next, the details of the progress bar display mode process of step S7 of FIG. 3 will be described with reference to FIG. 18. The process of FIG. 18 is performed when it is determined at step S6 of FIG. 3 that the change of the progress bar display mode is instructed.

At step 151, the control unit 15 determines whether the screens of both the main display area and the sub display areas are in a non-progress bar display mode. When the screens of both the main display area 202 and the sub display area 205 are in the non-progress bar display mode, as shown in FIG. 4, the progress bar display area is displayed neither on the screen of the main display area 202 nor on the screen of the sub display area 205.

Figure 19:
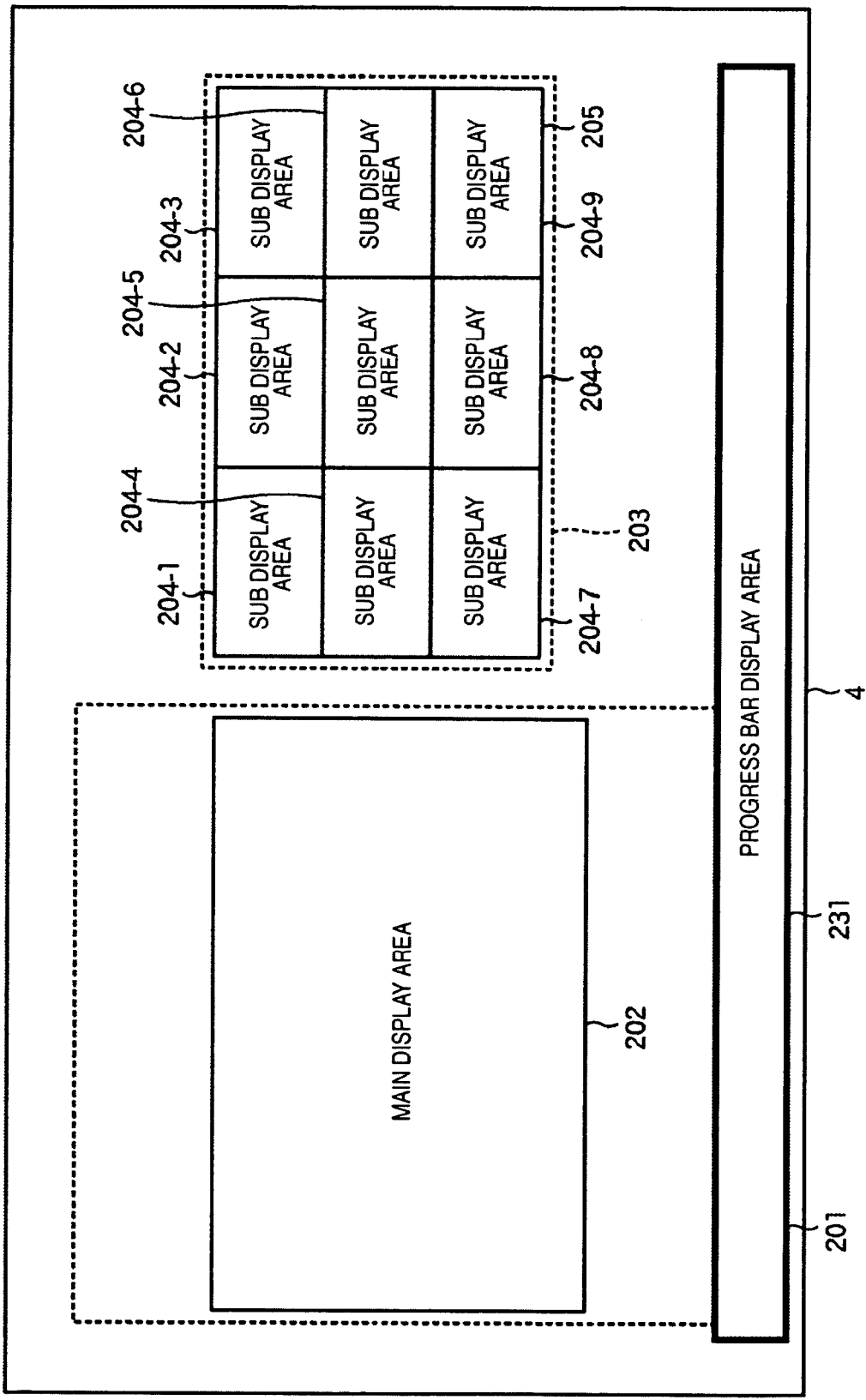
FIG. 19 is a view showing a state in which a progress bar display area is displayed.

When the screens of both the main display area 202 and the sub display area 205 are in the non-progress bar display mode, at step S152, the control unit 15 puts the screen of the main display area into the progress bar display mode. As a result, as shown in FIG. 19, there occurs a state where the progress bar display area 231 is displayed in the main display area 202. The degree of the temporal progress of the corresponding image is displayed in the progress bar display area 231. That is, the start point of the image is the left end of the progress bar, and the end point thereof is the right end, and the present position of the image is indicated by a rod-like graph extending from left to the right with the passage of time.

Figure 20:
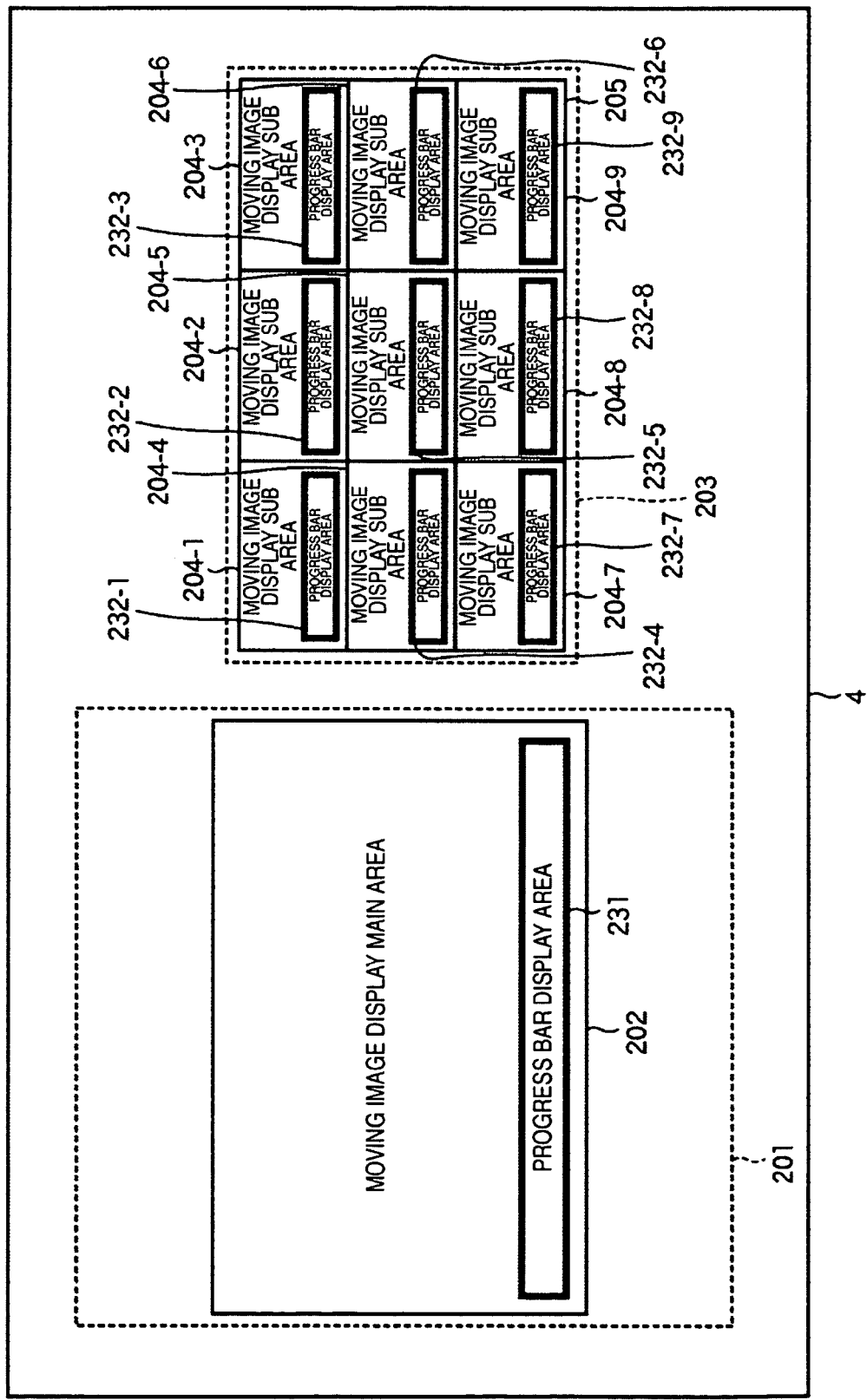
FIG. 20 is a view showing another state in which a progress bar display area is displayed.

At step S151, when it is determined that neither the screen of the main display area 202 nor the screen of the sub display area 205 is in the non-progress bar display mode, or after the process of step S152, the control unit 15 determines at step S153 whether only the screen of the main display area is in the progress bar display mode. As shown in FIG. 19, when only the screen of the main display area 202 is in the progress bar display mode, at step S154, the control unit 15 puts the screen of the sub display area into the progress bar display mode. As a result, as shown in FIG. 20, there occurs a state where the progress bar display area 231 is displayed on the screen of the main display area 202, and progress bar display areas 232-1 to 232-9 are displayed also in the sub display areas 204-1 to 204-9.

At step S153, when it is determined that only the main display area 202 is not in the progress bar display mode, or after the process of step S154, the control unit 15 determines at step S155 whether screens of both the main display area and the sub display area are in the progress bar display mode. As shown in FIG. 20, when the screens of both the main display area 202 and the sub display area 205 are in the progress bar display mode, at step S156, the control unit 15 puts the screens of both the main display area and the sub display area into the non-progress bar display mode. As a result, as shown in FIG. 4, there occurs a state where the progress bar display area is displayed neither on the screen of the main display area 202 nor on the screen of the sub display area 205.

At step S155, when it is determined that neither the main display area 202 nor the sub display area 205 is in the progress bar display mode, or after the process of step S156, the process is returned to step S7 of FIG. 3.

As a result of the above process, as shown in FIG. 7, the state where neither the screen of the main display area 202 nor the screen of the sub display area 205 is in the progress bar display mode, the state where only the screen of the main display area 202 is in the progress bar display mode, and the state where the screens of both the main display area 202 and the sub display area 205 are in the progress bar display mode are sequentially switched each time the user operates the select button 106.

Figure 21:
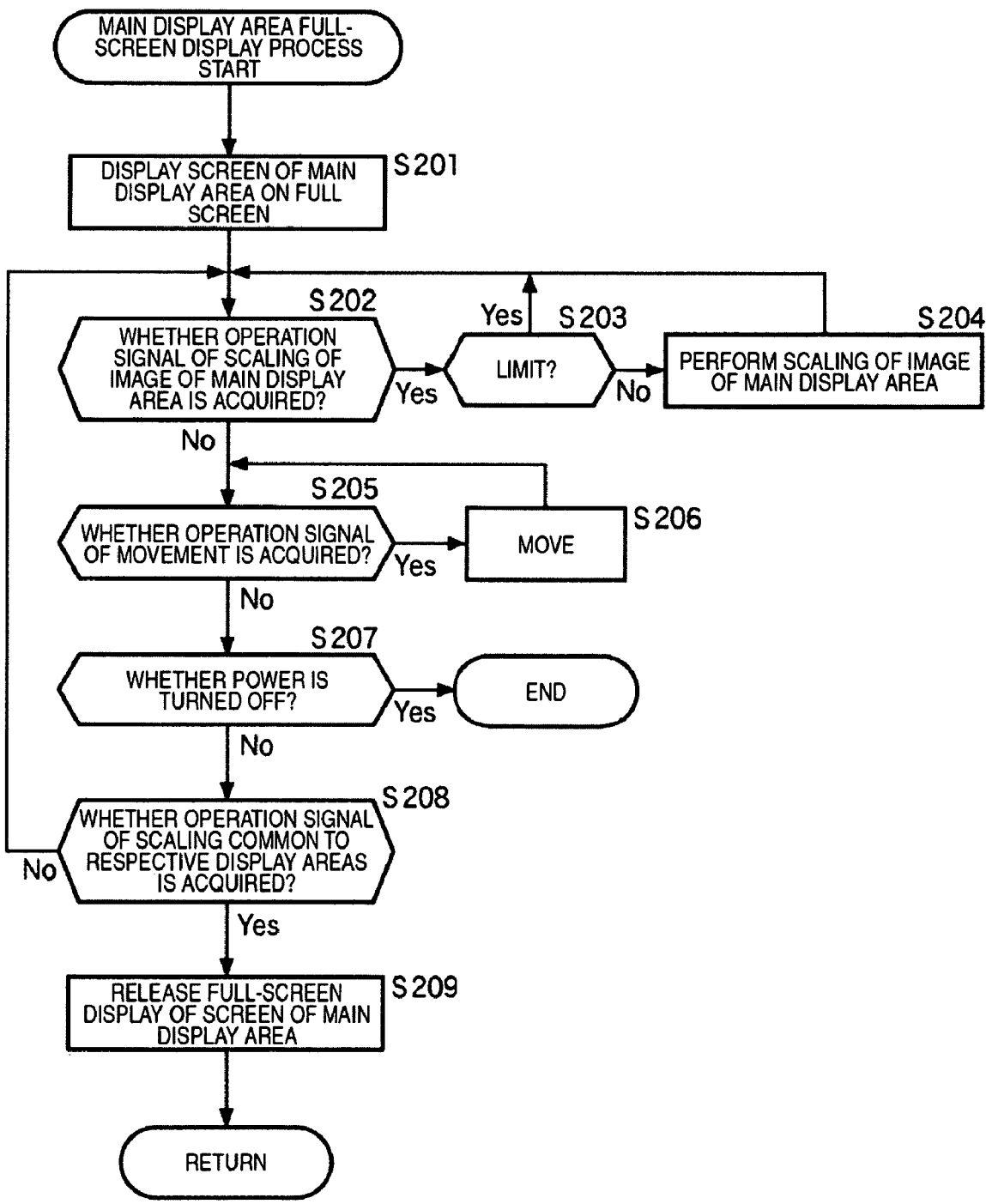
FIG. 21 is a view for explaining a main display area full-screen display process.

Next, the details of the main display area full-screen display process of step S10 of FIG. 3 will be described with reference to FIG. 21. This process is performed when it is determined at step S9 of FIG. 3 that the main display area 202 is focused.

Figure 22:
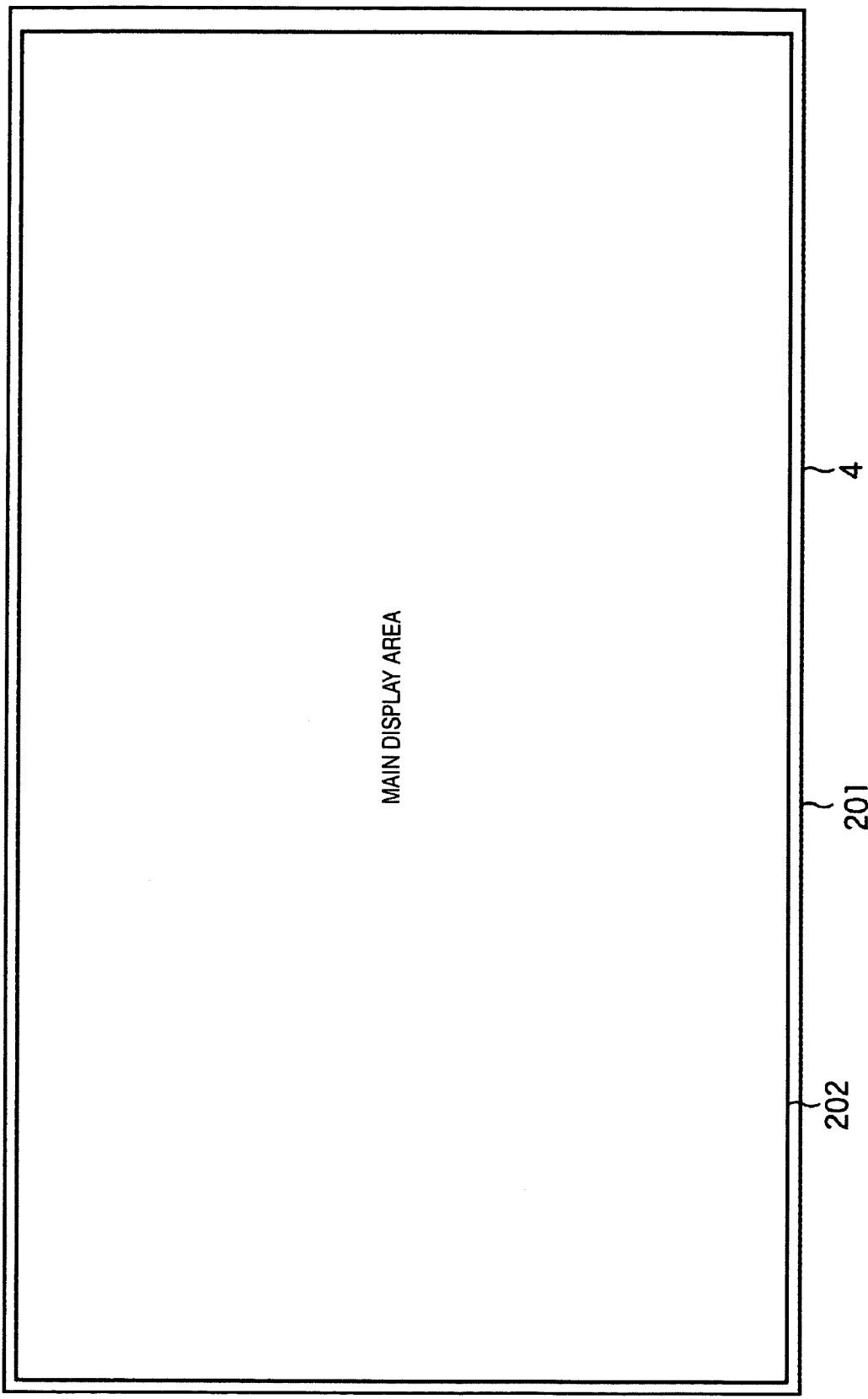
FIG. 22 is a view showing a state in which a screen of a main display area is displayed on full screen.

At step S201, the control unit 15 changes the screen of the main display area into the full-screen display. That is, as shown in FIG. 22, the screen of the sub display area 205 is erased, and only the screen of the main display area 202 is displayed as the main moving image view 201 over almost the entire display surface 4.

At step S202, the control unit 15 determines whether the operation signal of scaling of the image of the main display area is acquired. Specifically, when the image of the main display area 202 is scaled in the range of 1 to 4 times, the user tilts the analog stick 112R forward. When the enlarged image is returned to the original state, the user tilts the analog stick 112R backward. When the operation signal of the forward or backward tilt of the analog stick 112R is acquired, the control unit 15 determines at step S203 whether the scaling reaches the limit. When the scaling is not performed up to the limit (1 time or 4 times), the control unit 15 scales the image of the main display area at step S204.

When the image is enlarged to the limit, it may be impossible to further perform the scaling. Then, when it is determined at step S203 that the image is scaled to the limit, or after the process of step S204, the process is returned to step S202, and the subsequent process is repeated. The user adjusts the time of the operation of the analog stick 112R, and can enlarge and display the image to a desired size in the range of 1 to 4 times.

Figure 23:
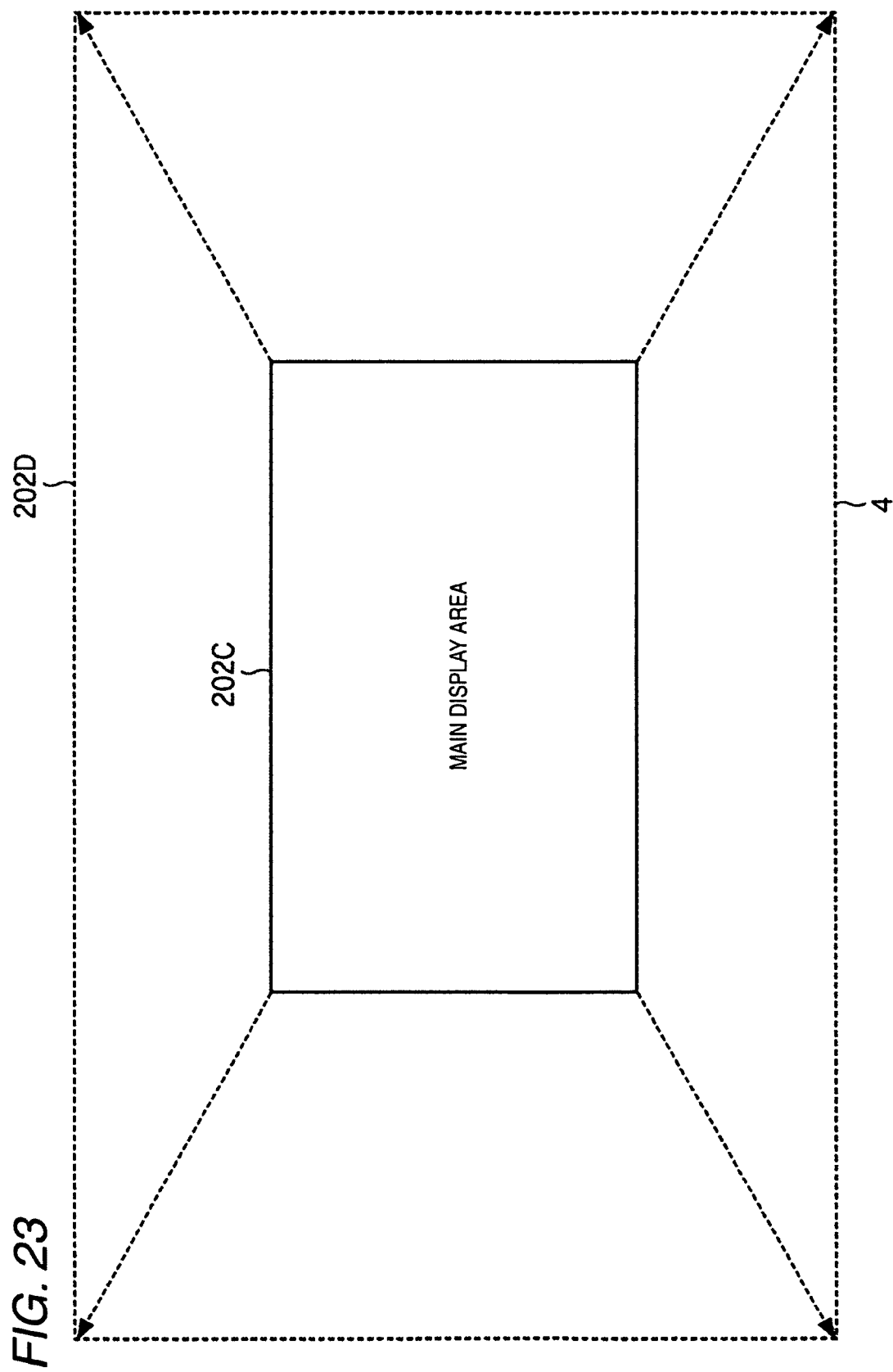
FIG. 23 is a view for explaining enlargement display of the screen of the main display area at the time of a full-screen display mode.

FIG. 23 shows a state where the image of the main display area 202 is enlarged as stated above. In this drawing, the image of a small main display area 202C is enlarged to the image of a large main display area 202D.

At step S202, when it is determined that the operation signal of scaling of the image of the main display area is not acquired, at step S205, the control unit 15 determines whether the operation signal of movement is acquired. When the user moves the center of the image enlarged four times at the maximum, the user operates the analog stick 112L. The operation signal of movement is acquired correspondingly to the operation of the analog stick 112L.

When the operation signal of movement is acquired, at step S206, the control unit 15 moves the center of the image of the enlarged and displayed main display area 202 correspondingly to the direction of the operation. Thereafter, the process is returned to step S205, and the subsequent process is repeated. That is, the user adjusts the time of the operation of the analog stick 112L and can display the enlarged image while an arbitrary position thereof is arranged at the center. By this, it is prevented that a portion which the user desires to see departs from the display range by the enlargement of the image and can not be confirmed.

At step S205, when it is determined that the operation signal of movement is not acquired, at step S207, the control unit 15 determines whether the power is turned off. When it is determined that the power is turned off, the process is ended.

When the power is not turned off, the control unit 15 determines at step S208 whether the operation signal of scaling common to the respective display areas is acquired. That is, a determination process similar to the case of step S8 of FIG. 3 is performed.

As stated above, since the operation of scaling common to the respective display areas is the operation of the square mark button 109 as the full-screen display switching button, it is determined whether the operation signal of the square mark button 109 is acquired. When the operation signal of the square mark button 109 is not acquired, the process is returned to step S202, and the subsequent process is repeated.

When the operation signal of the square mark button 109 is acquired, at step S209, the control unit 15 releases the full-screen display of the screen of the main display area.

When the user operates the square mark button 109 in the state where the screen of the main display area 202 is focused, the screen of the main display area 202 is displayed on full screen. When the analog stick 112R is operated in the state where the full-screen display is performed, the image of the main display area 202 is enlarged and displayed in the range of 1 to 4 times. When the square mark button 109 is operated in the full-screen display state, the full-screen display is released, and return is made to the state where the two screens of the main display area 202 and the sub display area 205 are displayed.

Figure 24:
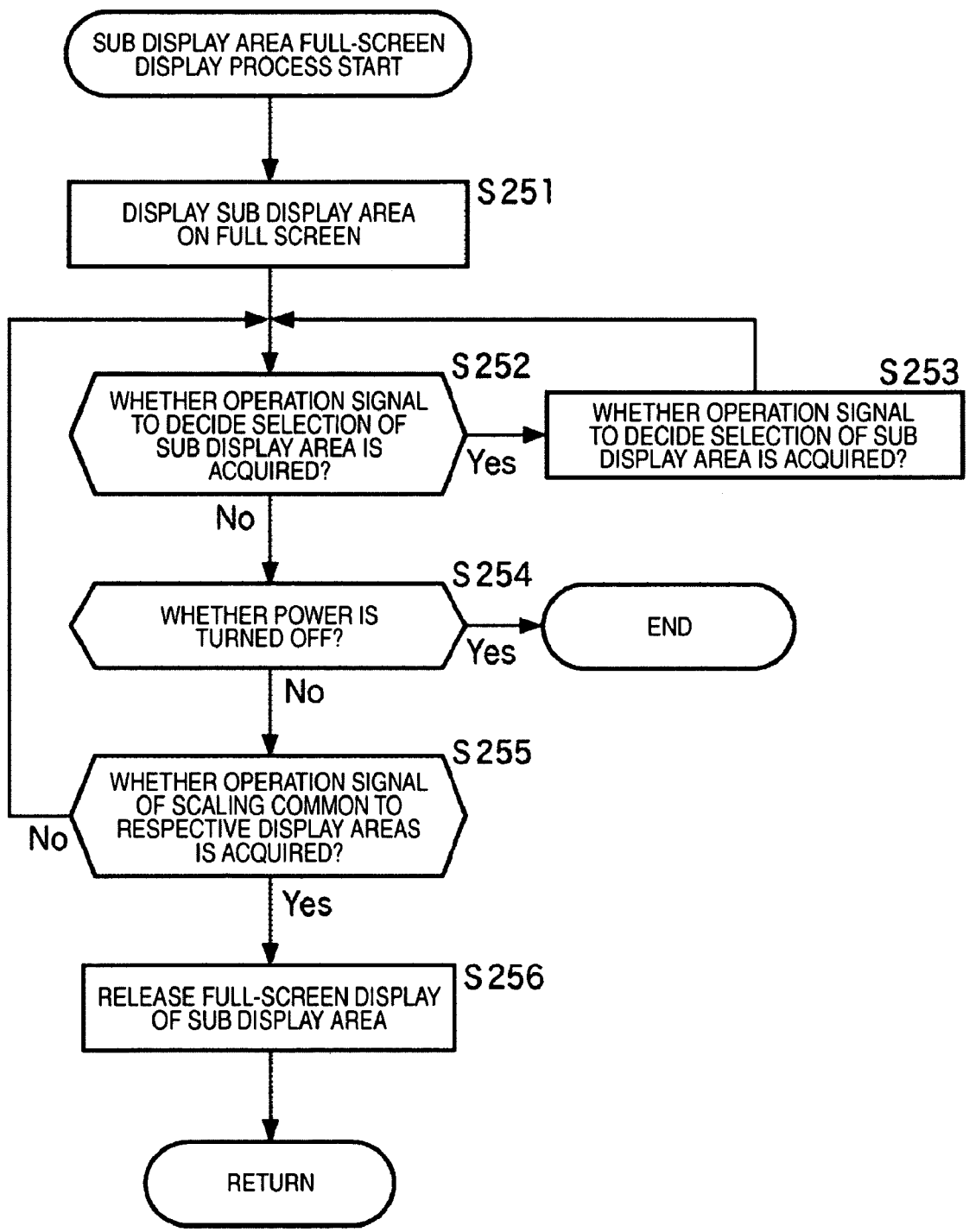
FIG. 24 is a flowchart for explaining a sub display area full-screen display process.

Next, the details of the sub display area full-screen display process of step S12 in FIG. 3 will be described with reference to FIG. 24. This process is performed when it is determined at step S11 in FIG. 3 that the sub display area 205 is focused.

Figure 25:
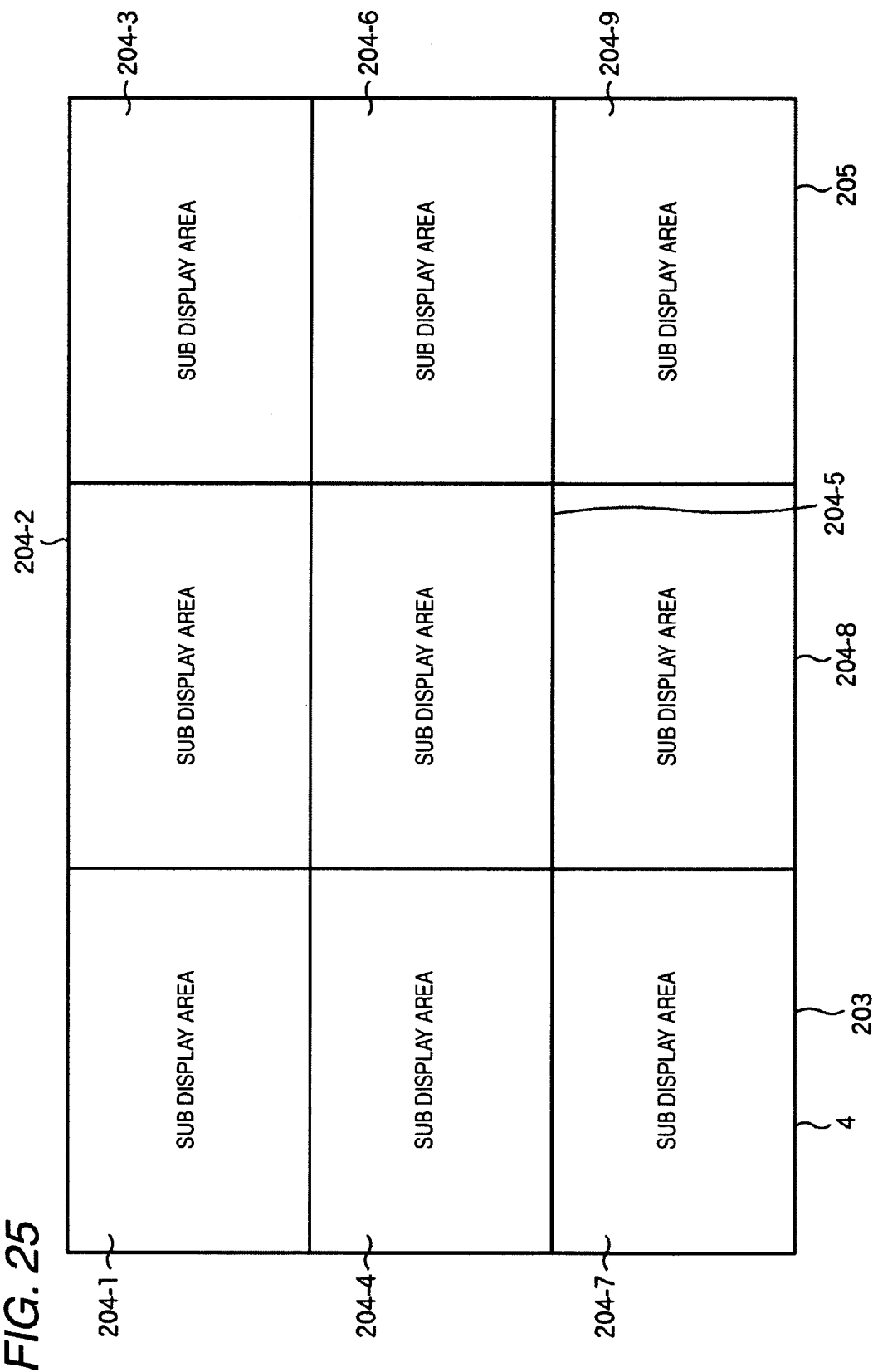
FIG. 25 is a view showing a state in which a screen of a sub display area is displayed on full screen.

At step S251, the control unit 15 displays the sub display area on full screen. That is, as shown in FIG. 25, the screen of the main display area 202 is erased, and only the sub display area 205 is displayed over almost the entire display surface 4. Incidentally, in actual, among the sub display areas 204-1 to 204-9, only the sub display area 204 selected by the cursor 251 at that time is displayed to be slightly larger than the other sub display areas. In this case, there occurs a state where part of the sub display areas adjacent to the selected sub display area are slightly concealed by the selected sub display area.

At step S252, the control unit 15 determines whether the operation signal to decide the selection of the sub display area is acquired. Specifically, when the user enlarges one of the images of the nine sub display areas 204, after selecting one sub display area 204 by the cursor 251, the user further operates the circle mark button 111 and decides the operation. When the operation signal of the circle mark button 111 is acquired, at step S253, the control unit 15 scales (enlarges in this case) the sub display area 204 selected by the cursor.

After the process of step S253, the process is returned to step S252, and the subsequent process is repeated.

Figure 26:
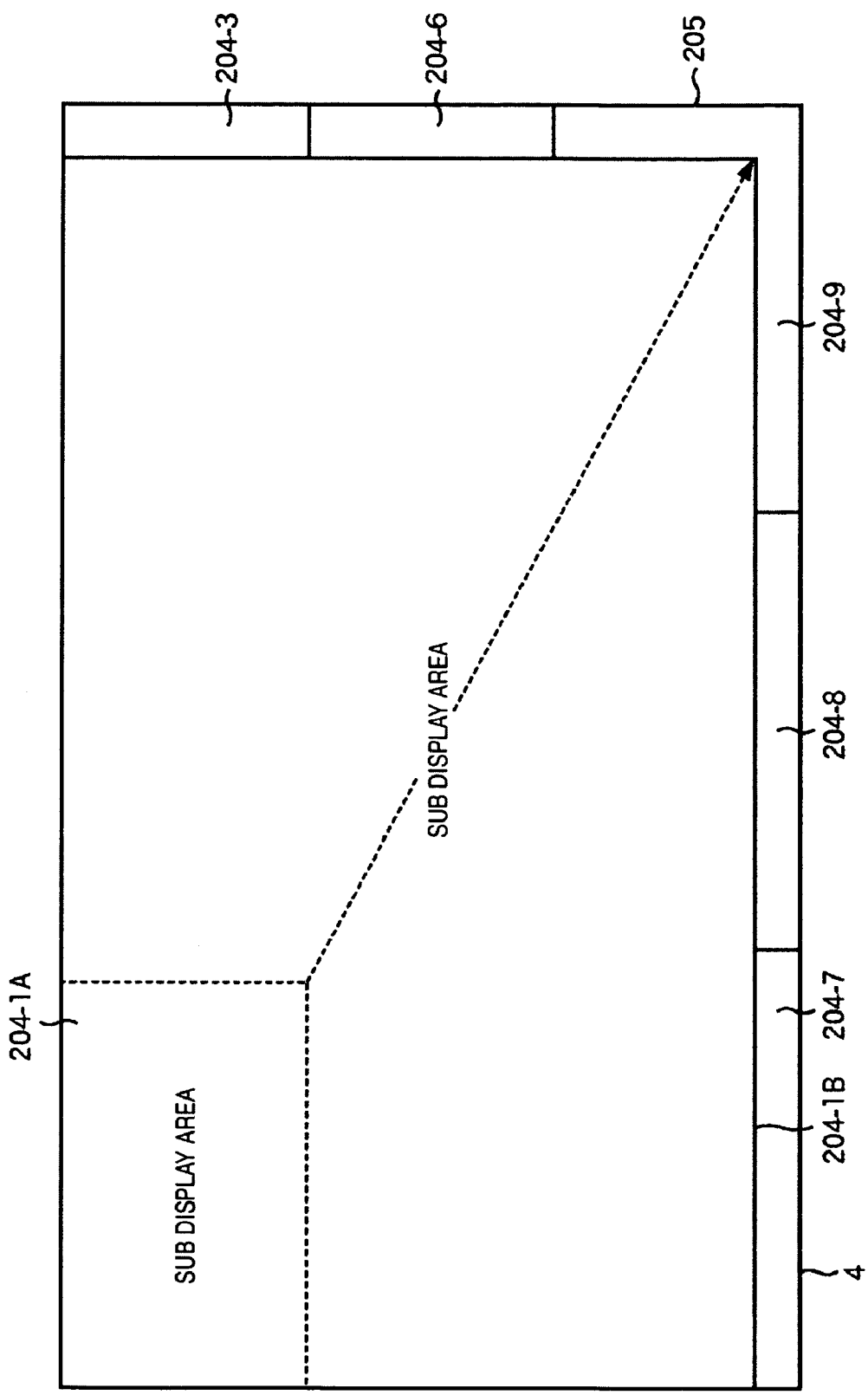
FIG. 26 is a view showing a state in which a screen of one sub display area is enlarged and displayed.

FIG. 26 shows a state where the thumbnail image of the sub display area 204 is enlarged as stated above. In this embodiment, the upper left sub display area 204-1A is enlarged to the sub display area 204-1B. Even if the one sub display area 204-1B is enlarged, part of the sub display areas 204-3, 204-6, 204-7, 204-8, 204-9 positioned at the right end and the lower end are not concealed but are displayed. By this, the user can easily recognize that the sub display area 205, not the main display area 202, is now displayed on full screen. As a result, an erroneous operation can be prevented from occurring.

At step S252, when it is determined that the operation signal to decide the selection of the sub display area 204 is not acquired, at step S254, the control unit 15 determines whether the power is turned off. When it is determined that the power is turned off, the process is ended.

When the power is not turned off, at step S255, the control unit 15 determines whether the operation signal of scaling common to the respective display areas is acquired. That is, a determination process similar to the case of step S8 of FIG. 3 is performed.

As stated above, since the operation of scaling common to the respective display areas is the operation of the square mark button 109, it is determined whether the operation signal of the square mark button 109 is acquired. When the operation signal of the square mark button 109 is not acquired, the process is returned to step S252 and the subsequent process is repeated.

When the operation signal of the square mark button 109 is acquired, at step S256, the control unit 15 releases the full-screen display of the sub display area. Thereafter, the process is returned to step S12 of FIG. 3.

When the user operates the square mark button 109 in the state where the sub display area 205 is focused, the sub display area 205 is displayed on full screen. When one sub display area 204 is selected and the circle mark button 111 is operated in the state where the full-screen display is performed, the selected sub display area 204 is enlarged and displayed. When the square mark button 109 is operated in the full-screen display state, the full-screen display state is released, and return is made to the state where the two screens of the main display area 202 and the sub display area 205 are displayed.

The above respective functions are independent and can be performed in combination.

Figure 27:
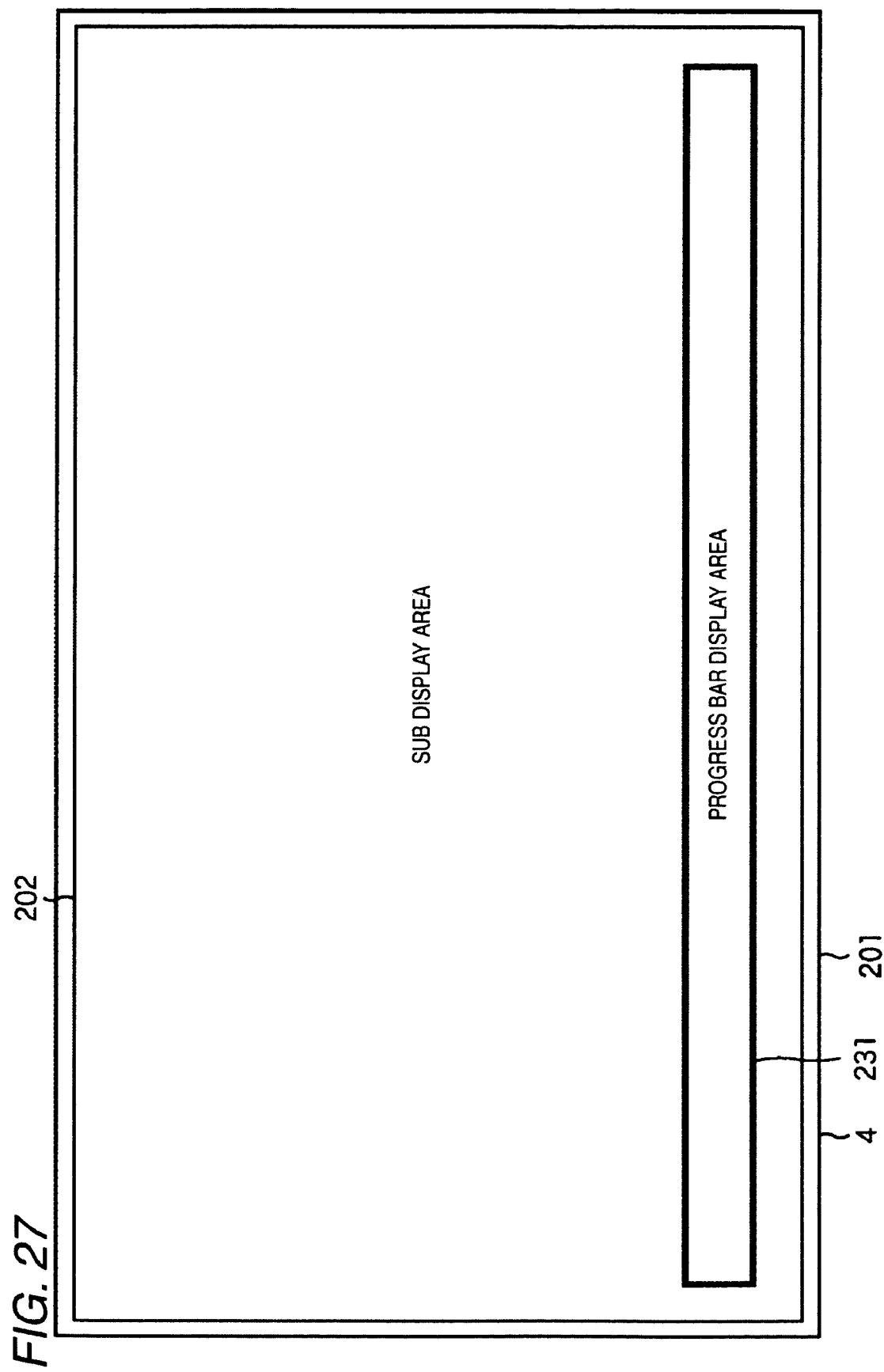
FIG. 27 is a view showing a state in which a screen of a main display area displaying a progress bar display area is displayed on full screen.

For example, FIG. 27 shows a state in a case where the full-screen display is instructed in the mode in which the progress bar 231 of the main display area 202 is displayed. This state is realized also when the progress bar display mode is set in the case where the screen of the main display area 202 is displayed on full screen, or also when the full-screen display is instructed in the case where the progress bar display mode is set on the screen of the main display area 202. Although the description will be omitted, also in the following example, plural functions can be combined irrespective of the order of function instructions.

Figure 28:
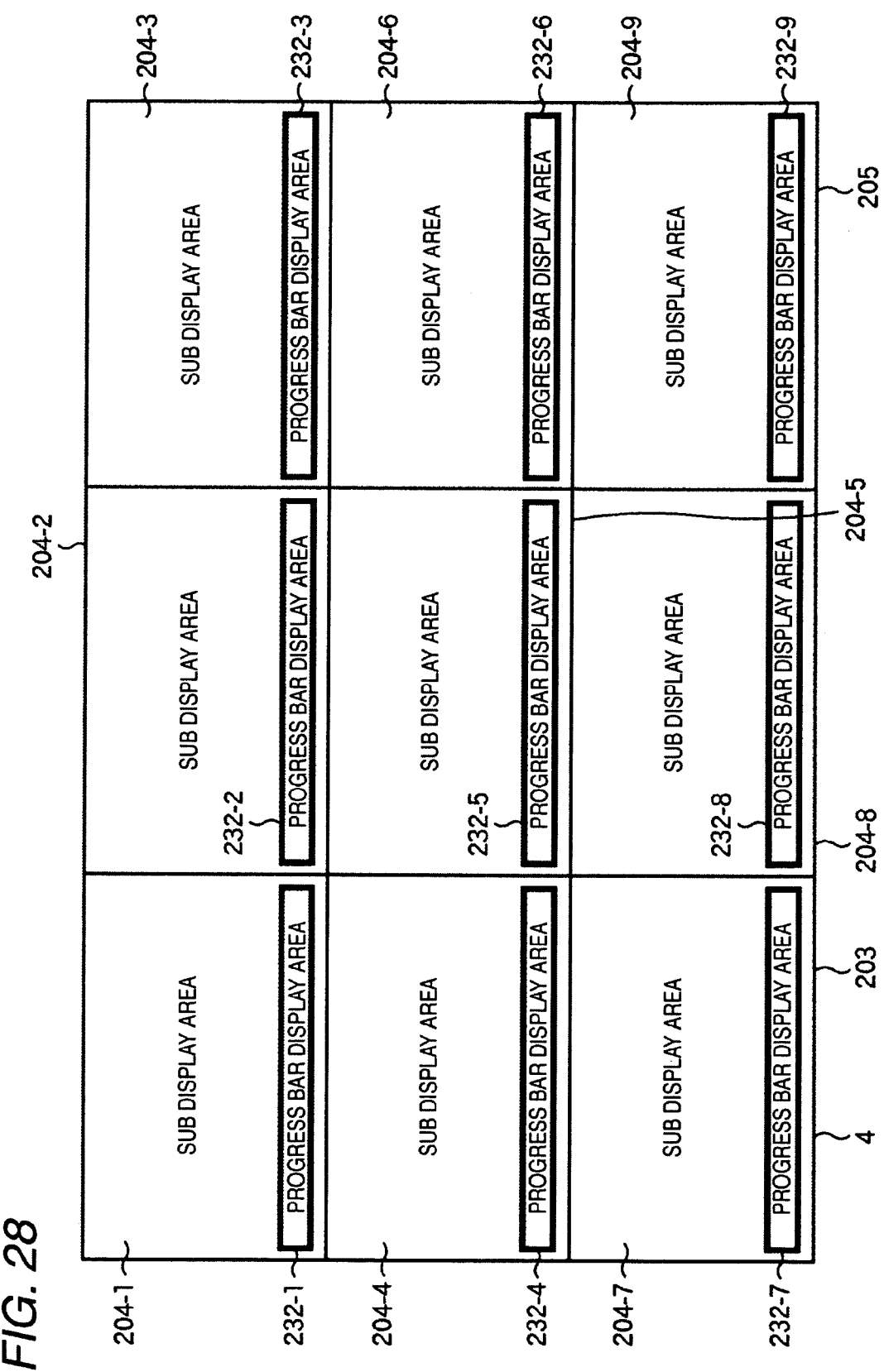
FIG. 28 is a view showing a state in which a screen of a sub display area displaying a progress bar display area is displayed on full screen.

FIG. 28 shows a state of a display in a case where full-screen display is instructed in the mode in which the progress bar 232 of the sub display area 204 is displayed.

Figure 29:
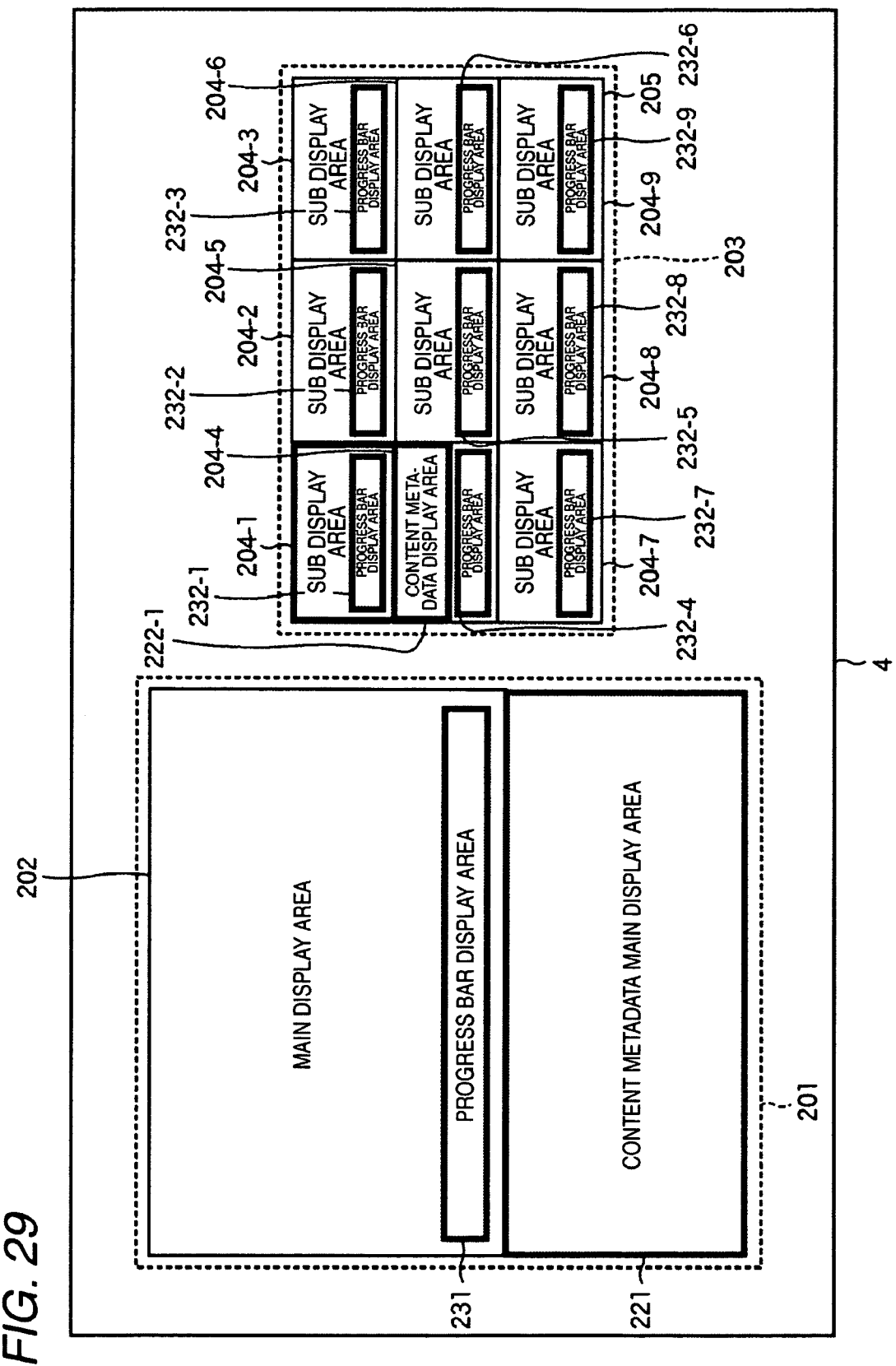
FIG. 29 is a view showing a state in which a progress bar display area and a content metadata display area are displayed on screens of a main display area and a sub display area.

FIG. 29 shows a state where the progress bar display areas 231 and 232 and the content metadata display areas 221 and 222 are respectively displayed in the main display area 202 and the sub display area 204.

Figure 30:
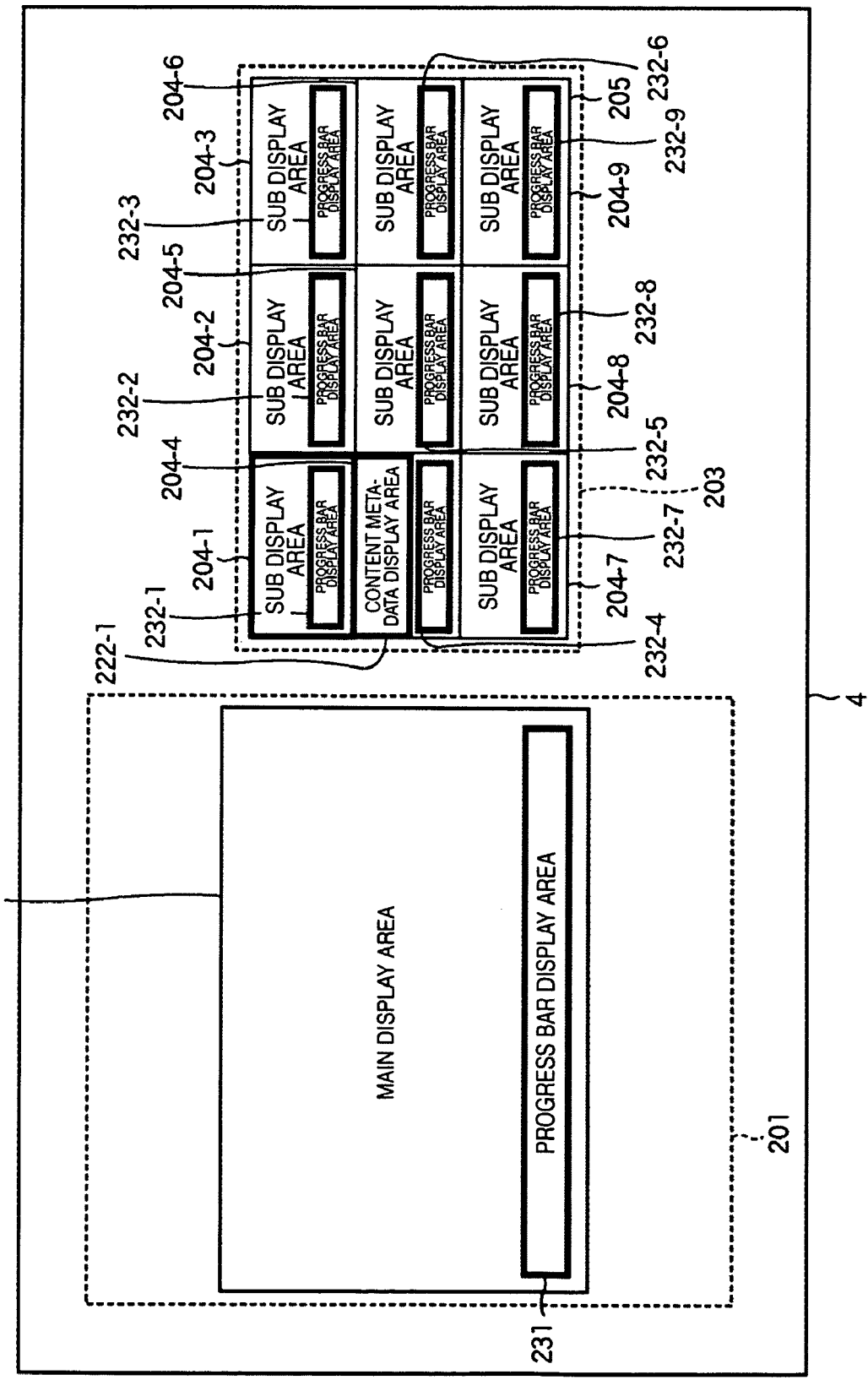
FIG. 30 is a view showing a state in which a progress bar display area is displayed on a screen of a main display area, and a progress bar display area and a content metadata display area are displayed on a screen of a sub display area.

FIG. 30 shows a state where the progress bar 231 is displayed on the screen of the main display area 202, and the progress bar display area 232 and the content metadata display area 222 are displayed in the sub display area 204.

Figure 31:
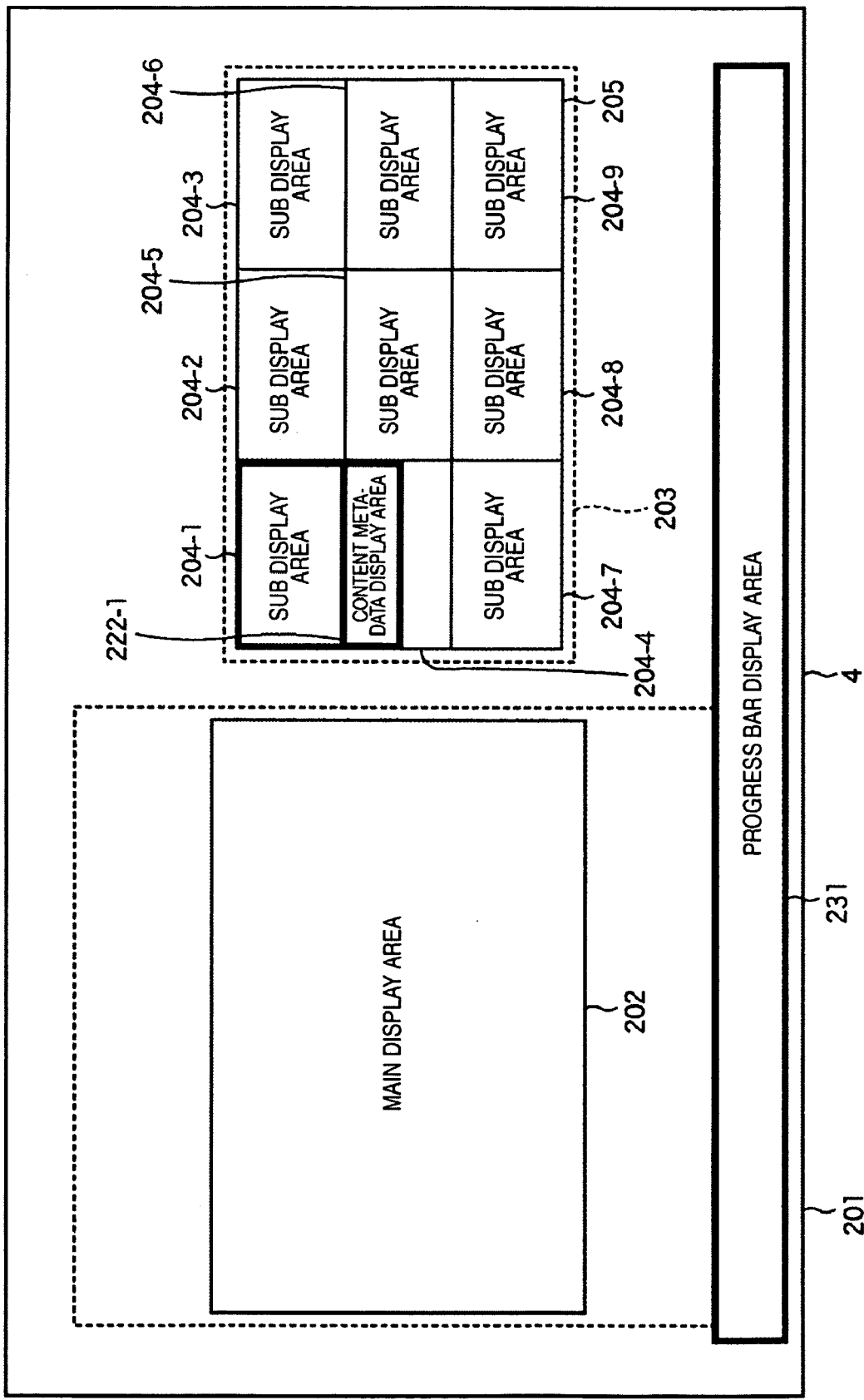
FIG. 31 is a view showing a state in which a progress bar display area is displayed on a main display area, and a content metadata display area is displayed on a screen of a sub display area.

FIG. 31 shows a state where the progress bar display area 231 is displayed on the screen of the main display area 202, and the content metadata display area 222 is displayed in the sub display area 204.

Figure 32:
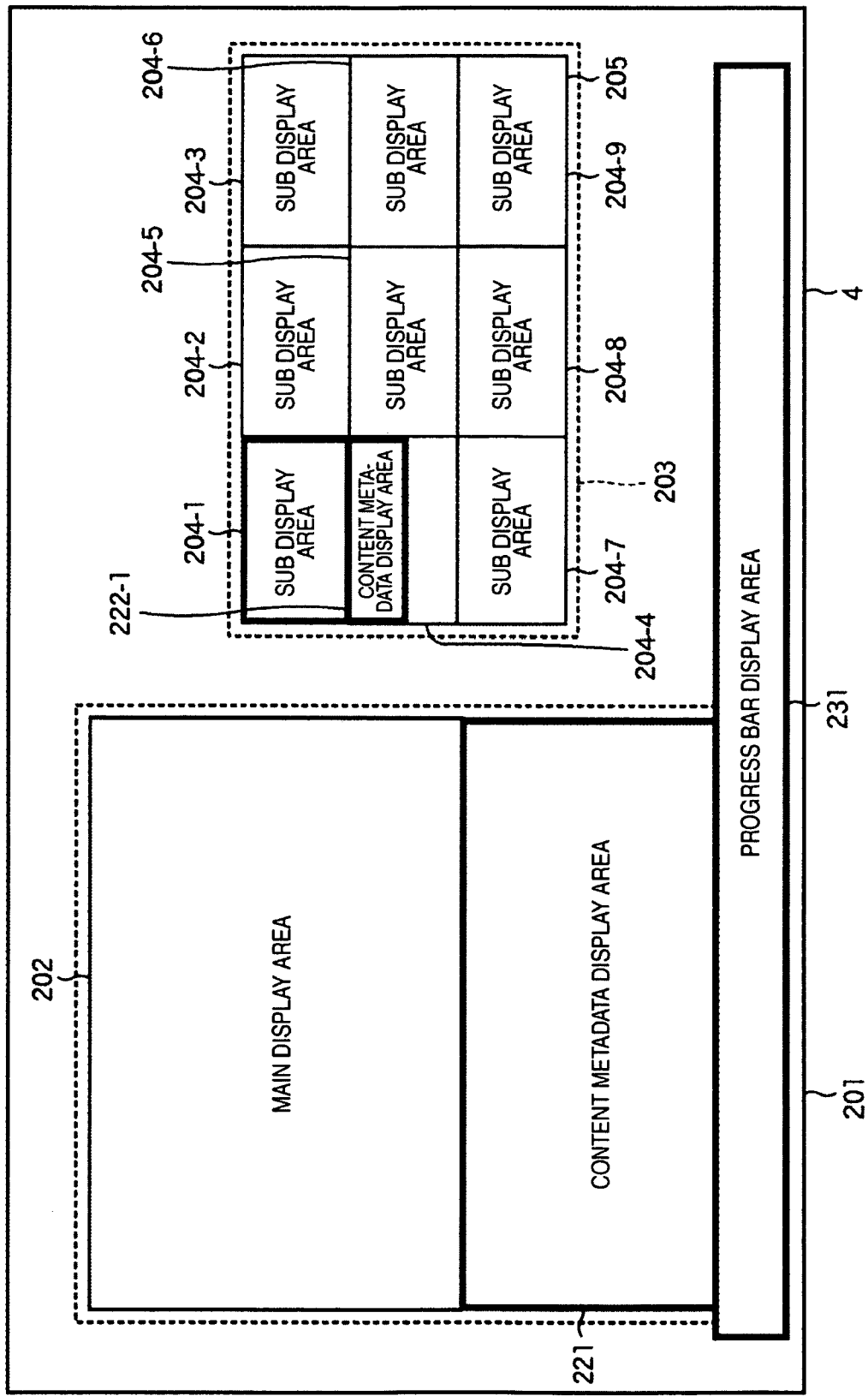
FIG. 32 is a view showing a state in which a content metadata display area and a progress bar display area are displayed on a screen of a main display area, and a content metadata display area is displayed on a screen of a sub display area.

FIG. 32 shows a state where the content metadata display area 221 and the progress bar display area 231 are displayed on the screen of the main display area 202, and the content metadata display area 222 is displayed in the sub display area 204.

Figure 33:
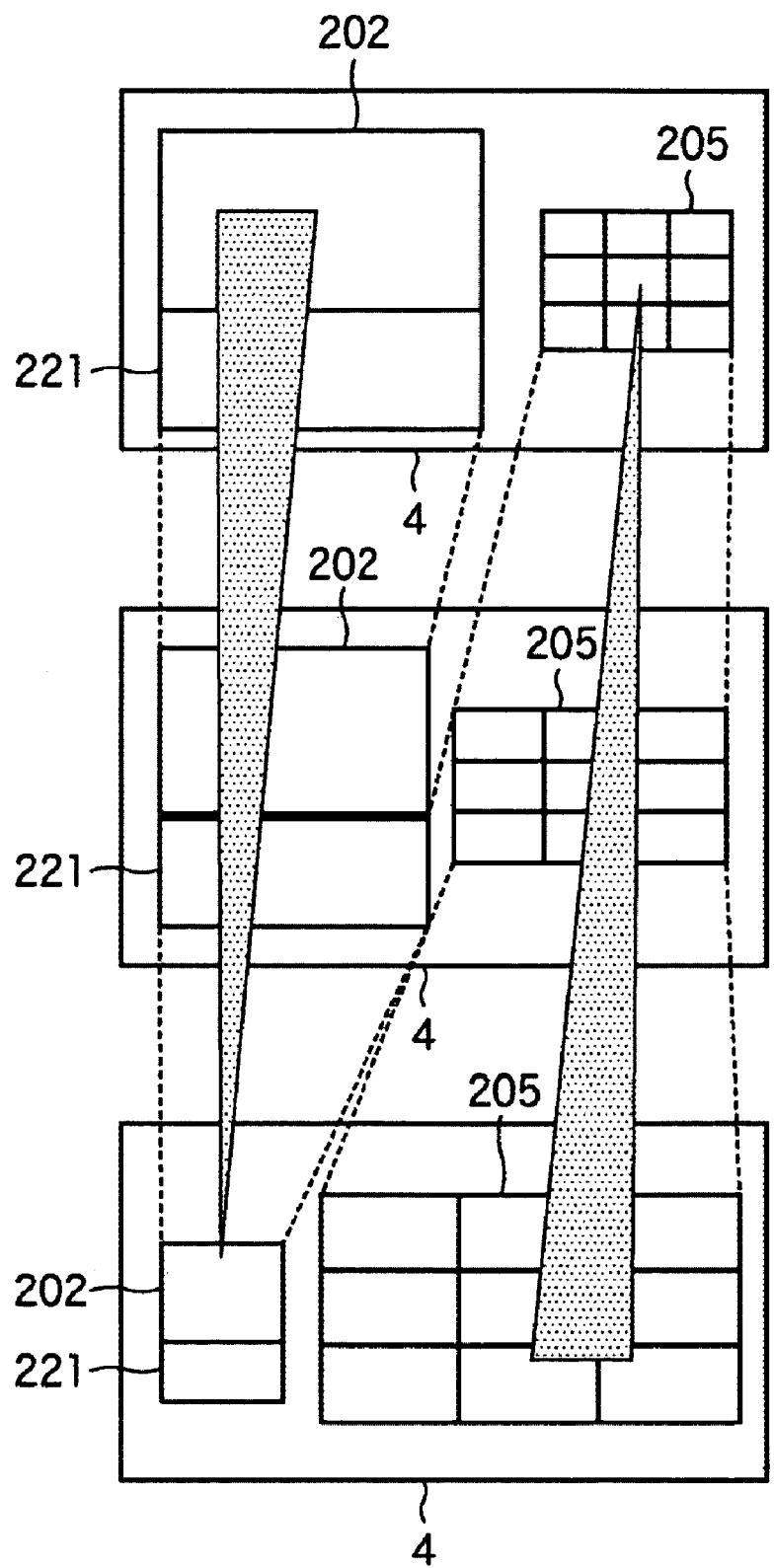
FIG. 33 is a view for explaining change of a right and left two-screen-size ratio in a state where a content metadata display area is displayed on a screen of a main display area, and a progress bar display area and a content metadata display area are not displayed on a screen of a sub display area.

FIG. 33 shows a state of change in the case where the right and left two-screen-size ratio change process is performed in the state where the content metadata display area 221 is displayed in the main display area 202.

Incidentally, of course, the combination of the functions is not limited to the above cases.

Figure 34:
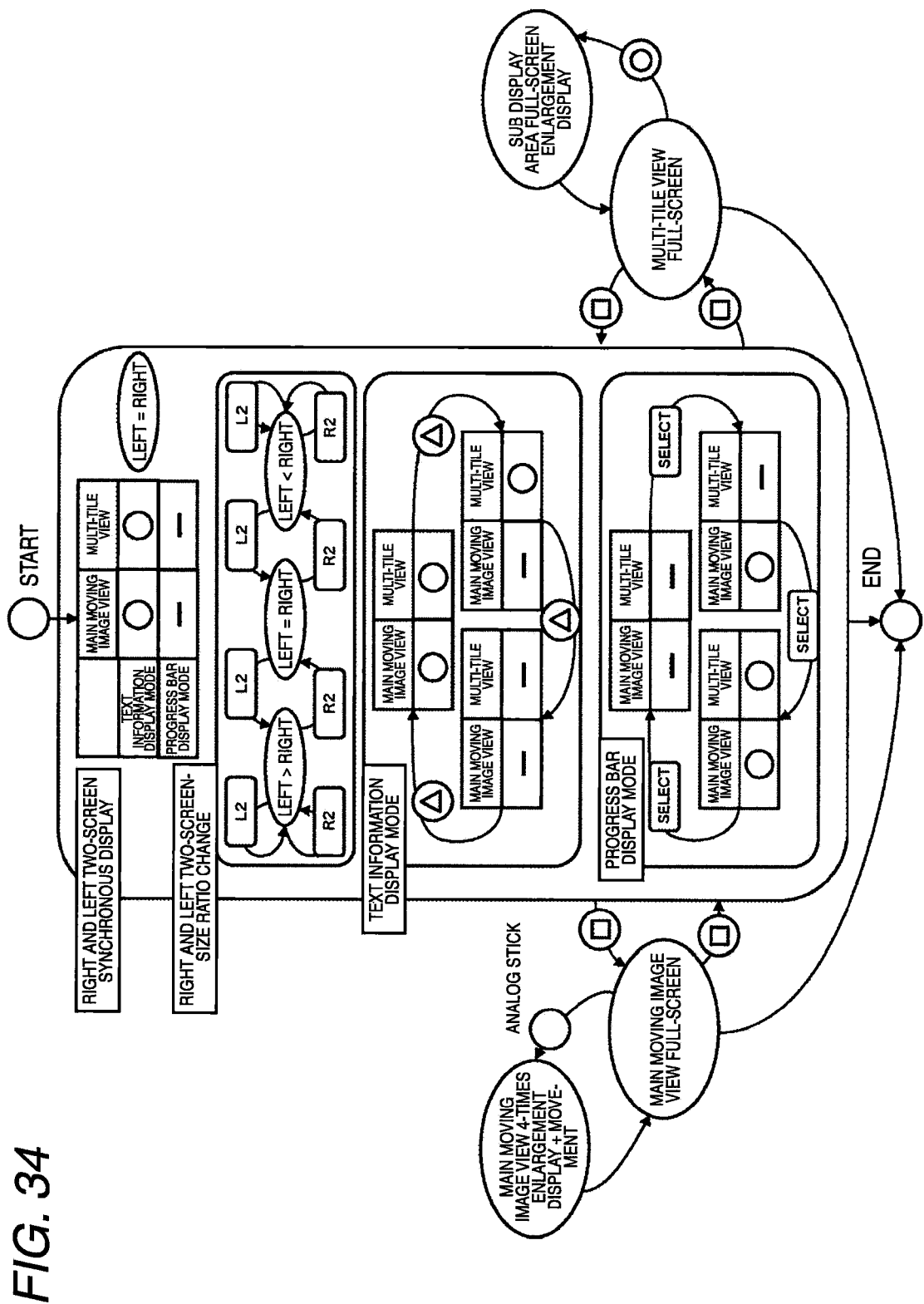
FIG. 34 is a view for explaining a state transition of functions.

FIG. 34 shows the transition of the states of the functions. When the image processing apparatus 1 is started, the screen of the main display area 202 and the screen of the sub display area 204 are displayed in the same size, and the text information display mode is set in each of them. However, the progress bar display mode is not set.

In the right and left two-screen-size ratio change process, when the L2 button 104 is operated in the state where the screen of the left main display area 202 is small and the screen of the right sub display area 205 is large, the screen of the left main display area 202 is gradually enlarged, the screen of the right sub display area 205 is gradually reduced, and both the screens come to have the same size. When the operation is further performed, there occurs a state where the screen of the left main display area 202 is large, and the screen of the right sub display area 205 is small.

When the R2 button 105 is operated in the state where the screen of the left main display area 202 is large and the screen of the right sub display area 205 is small, the screen of the left main display area 202 is gradually reduced, the screen of the right sub display area 205 is gradually enlarged, and both the screens come to have the same size. When the operation is further performed, there occurs a state where the screen of the left main display area 202 is small and the screen of the right sub display area 205 is large.

In the text information display mode, each time the triangular mark button 108 as the text information display mode switching button is operated, the state where the content metadata display areas 221 and 222 are displayed on the screens of both the main display area 202 and the sub display area 205, the state where the content metadata display area 222 is displayed only on the screen of the sub display area 205, the state where the content metadata display areas 221 and 222 are displayed neither on the screen of the main display area 202 nor on the screen of the sub display area 205, and the state where the content metadata display areas 221 and 222 are displayed on the screens of both the main display area 202 and the sub display area 205 sequentially and circularly transition.

In the progress bar display mode, each time the select button 106 as the progress bar display mode switching button is operated, the state where the progress bar display area is displayed neither on the screen of the main display area 202 nor on the screen of the sub display area 204, the state where the progress bar display area 231 is displayed only on the screen of the main display area 202, the state where the progress bar display areas 231 and 232 are displayed on the screens of both the main display area 202 and the sub display area 205, and the state where the progress bar display area is displayed neither on the screen of the main display area 202 nor on the screen of the sub display area 204 sequentially and circularly transition.

When the square button 109 as the full-screen display switching button is operated in the right and left two-screen display state, a focused one of the main display area 202 and the sub display area 204 is displayed on full screen, and when the square button 109 is operated in the full-screen display state, the full-screen display state is released, and return is made to the right and left two-screen display state.

When the analog stick 112R is operated in the full-screen display state of the screen of the main display area 202, the enlargement display is performed to a size in the range of 1 to 4 times corresponding to the operation angle. When the analog stick 112L is operated, the center position of the enlarged image is moved. However, when the magnification ratio is 1, the movement may be impossible.

When the circle mark button 111 as the decision button is operated in the full-screen display state of the sub display area 205, the selection by the cursor 251 is decided, and the selected sub display area 204 is enlarged and displayed.

As stated above, in the case of this embodiment, the square mark button 109 is used commonly to the full-screen display of both the main display area 202 and the sub display area 205. The area focused by the cursor is displayed on full screen. Accordingly, as compared with the case where a dedicated button is provided for each of the case where the screen of the main display area 202 is enlarged and the case where the screen of the sub display area 205 is enlarged, the number of buttons can be made small, the user can quickly select one button among many buttons by that, the erroneous operation is suppressed, and the operationality is improved.

Figure 35:
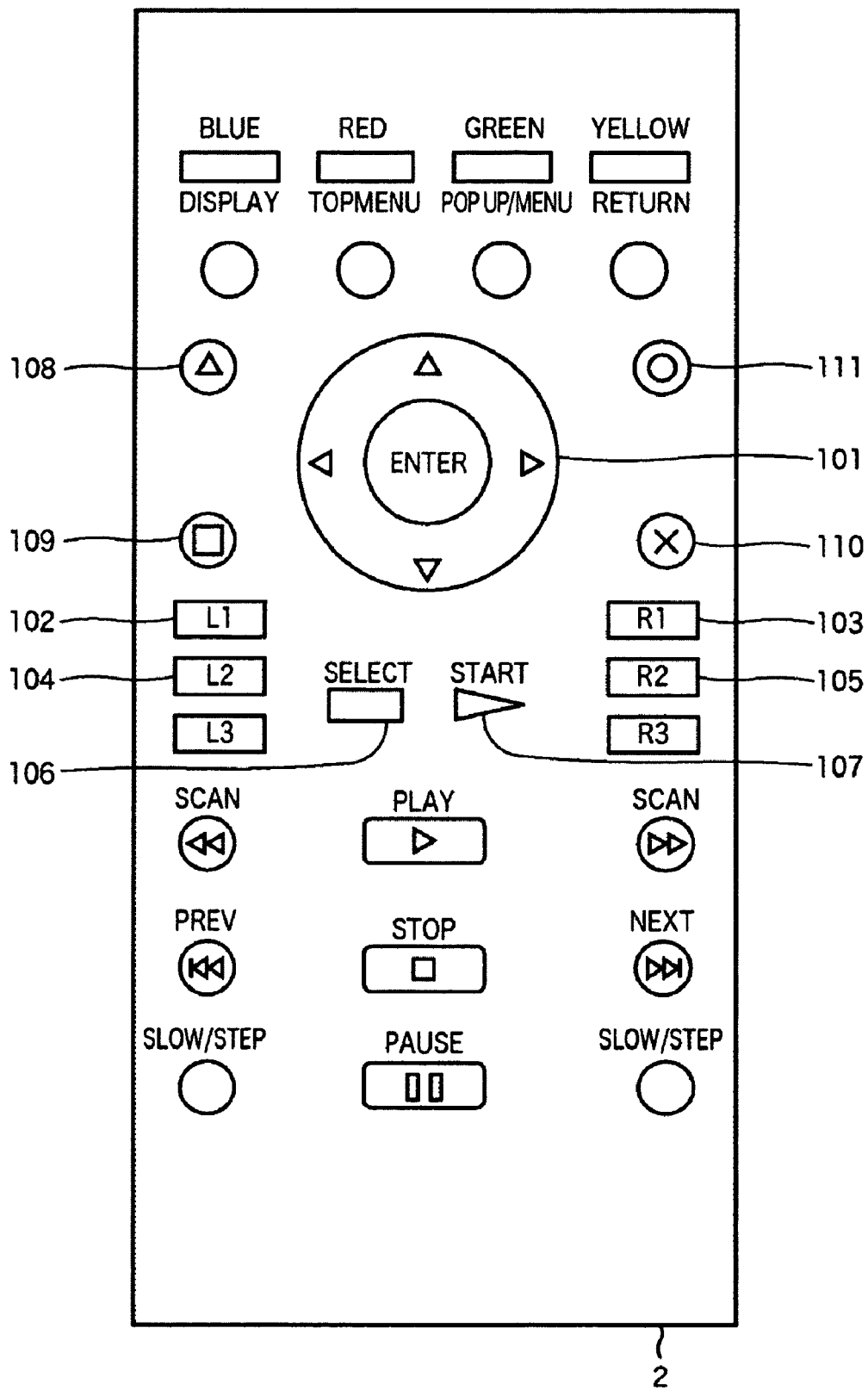
FIG. 35 is a plan view showing a structure of an operation unit of another embodiment.

FIG. 35 shows a structure of a remote controller as the operation unit 2 according to another embodiment. In FIG. 35, buttons corresponding to those of FIG. 2 are denoted by the corresponding reference numerals. Although the description thereof will be omitted to avoid duplication, an operation similar to the remote controller of FIG. 2 can be realized also by the remote controller of FIG. 35.

This controller includes plural buttons different from the controller of FIG. 2. Although each button is operated when a specified function assigned to the button is executed, since it does not directly relate to the invention, the description thereof will be omitted.

The foregoing series of processes can be executed by hardware, or can also be executed by software. When the series of processes are executed by software, a program constituting the software is assembled in the dedicated hardware of a computer, or is installed from a program recording medium into a general-purpose personal computer which can execute various functions by installing various programs.

The program recording medium to store the program which is installed in the computer and is put in an executable state by the computer is a removable medium as a package medium, such as a magnetic disk (including a flexible disk), an optical disk (including a CD-ROM (Compact Disc-Read Only Memory), a DVD (Digital Versatile Disk), or a magneto-optical disk) or a semiconductor memory, or a ROM in which the program is temporarily or permanently stored, or a hard disk. The storage of the program into the program storage medium is performed using a wired or wireless communication medium, such as local area network, Internet or digital satellite broadcast, through an interface such as a router or a modem as required.

Incidentally, in the present specification, steps describing the program include processes performed in time series along the recited order, and processes which are not necessarily performed in time series but are performed in parallel or individually.

Besides, the embodiments of the present invention are not limited to the foregoing embodiments, and various modifications can be made within the scope not departing from the gist of the invention.

What is claimed is:

1. An image processing apparatus comprising:
a generation unit configured to generate image signals for displaying a plurality of screen areas on a screen, the screen areas comprising sub display areas to display a plurality of different thumbnail images, and a main display area to display an image selected from one of the thumbnail images in the sub display area;
an operation signal acquisition unit configured to acquire an operation signal from a user; and
a control unit configured to control displaying images on the screen areas,
wherein the control unit erases an unfocused image and displays a focused image on the full screen, when the operation signal being a first operation signal common to the plurality of screen areas to scale the screen areas is acquired from the user; and
wherein if a second operation signal to synchronously scale the main display area and the sub display areas is acquired, the control unit reduces a first one of the display areas synchronously with enlarging a second one of the display areas.

2. The image processing apparatus according to claim 1, wherein when the common operation signal is acquired in a state where the screen is in a full-screen mode, the control unit releases the full-screen mode, and displays the plurality of screen areas.

3. The image processing apparatus according to claim 1, wherein when a third operation signal from the user to scale an image of the main display area is acquired in a state where the screen is displaying the main display area in a full-screen mode, the control unit scales the image of the main display area in a range greater than one time.

4. The image processing apparatus according to claim 3, wherein when a fourth operation signal to move the image of the main display area is acquired in a state where the screen is displaying of the main display area in the full-screen mode, the control unit moves the image of the main display area.

5. The image processing apparatus according to claim 1, wherein when a third operation signal to select one of the sub display areas is acquired in a state where the screen is displaying the sub display areas in a full-screen mode, the control unit scales the selected sub display area without concealing the other sub display areas.

6. The image processing apparatus according to claim 1, wherein when a third operation signal to switch to a text information display mode is acquired, the control unit switches the screen among:
a first mode in which an area for displaying the text information is displayed on both the main display area and one of the sub display areas,
a second mode in which the area for displaying the text information is displayed only on at least one of the sub display areas, and
a third mode in which the area for displaying the text information is displayed neither on the main display area nor on the sub display areas.

7. The image processing apparatus according to claim 1, wherein when a third operation signal to switch to a progress bar display mode is acquired, the control unit switches the screen among:

a first mode in which an area for displaying the progress bar is displayed neither on the main display area nor on the sub display areas, a second mode in which the area for displaying the progress bar is displayed only on the main display area, and a third mode in which the area for displaying the progress bar is displayed on both the main display area and the sub display areas.

8. The image processing apparatus according to claim 1, further comprising an image signal acquisition unit configured to acquire a plurality of different image signals as origins of the plurality of thumbnail images through broadcast signals or Internet.

9. An image processing method of an image processing apparatus, comprising the steps of:

generating image signals for displaying a plurality of screen areas on a screen, the screen areas comprising sub display areas to display a plurality of different thumbnail images, and a main display area to display an image selected from one of the thumbnail images in the sub display area;

acquiring an operation signal from a user;

erasing an unfocused image and displaying a focused image on the full screen, when the operation signal being a first operation signal common to the plurality of screen areas to scale the screen areas is acquired from the user; and reducing a first one of the display areas synchronously with enlarging a second one of the display areas if a second operation signal to synchronously scale the main display area and the sub display areas is acquired.

10. A non-transitory recording medium recorded with a program, the program when executed by a computer, causing the computer to execute the processes of:

generating image signals for displaying a plurality of screen areas on a screen, the screen areas comprising sub display areas to display a plurality of different thumbnail images, and a main display area to display an image selected from one of the thumbnail images in the sub display area;

acquiring an operation signal from a user;

erasing an unfocused image and displaying a focused image on the full screen, when the operation signal being a first operation signal common to the plurality of screen areas to scale the screen areas is acquired from the user; and reducing a first one of the display areas synchronously with enlarging a second one of the display areas if a second operation signal to synchronously scale the main display area and the sub display areas is acquired.

* * * * *